US012720470B2

(12) United States Patent
Manolakos et al.

(10) Patent No.: US 12,720,470 B2
(45) Date of Patent: Aug. 25, 2026

(54) TIMING ADVANCE ASSIGNMENT PROCEDURES FOR ALIGNING SIDELINK POSITIONING REFERENCE SIGNAL (PRS) RECEPTIONS AT TARGET USER EQUIPMENTS (UEs) OR ANCHOR (POS)-PEER UES

(71) Applicant: QUALCOMM Incorporated, San Diego, CA (US)

(72) Inventors: Alexandros Manolakos, Athens (GR); Mukesh Kumar, Hyderabad (IN); Srinivas Yerramalli, San Diego, CA (US); Weimin Duan, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/555,676

(22) PCT Filed: Apr. 28, 2022

(86) PCT No.: PCT/US2022/071970
§ 371 (c)(1),
(2) Date: Oct. 16, 2023

(87) PCT Pub. No.: WO2022/272193
PCT Pub. Date: Dec. 29, 2022

(65) Prior Publication Data

US 2024/0314724 A1 Sep. 19, 2024

(30) Foreign Application Priority Data

Jun. 23, 2021 (GR) .............................. 20210100414

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 56/0045* (2013.01); *H04W 92/18* (2013.01)

(58) Field of Classification Search
CPC . H04W 64/00; H04W 56/0045; H04W 92/18; H04W 8/005; H04W 56/0015;
(Continued)

(56) References Cited

U.S. PATENT DOCUMENTS

2015/0181366 A1* 6/2015 Chae ..................... H04W 72/51 370/336
2016/0095080 A1* 3/2016 Khoryaev ............. G01S 5/0284 455/456.1

(Continued)

FOREIGN PATENT DOCUMENTS

WO 2020033088 A1 2/2020
WO WO-2020198616 A1 10/2020
WO 2021030583 A1 2/2021

OTHER PUBLICATIONS

International Search Report and Written Opinion—PCT/US2022/071970—ISA/EPO—Aug. 8, 2022.
Taiwan Search Report—TW111116573—TIPO—Jan. 15, 2026.

*Primary Examiner* — Kabir A Timory
(74) *Attorney, Agent, or Firm* — Norton Rose Fulbright US LLP/QUALCOMM Incorporated

(57) ABSTRACT

This disclosure provides systems, methods, and devices for wireless communication that provide managing transmissions of sidelink positioning reference signals (PRS) with a timing advance offset (TA) from a sidelink node. In aspects, a sidelink node (e.g., a target user equipment (UE) or an
(Continued)

assisting UE) may receive transmissions from a plurality of nodes (e.g., target UEs or assisting UEs). The sidelink node obtains at least one TA to be used by a transmitting node of the plurality of nodes for transmitting a sidelink PRS to the sidelink node (e.g., to advance the sidelink PRS transmission to the sidelink node with respect to the timing of the first transmission). The TA is an offset obtained by the sidelink node based on the receiving times of the transmissions from the plurality of nodes. The sidelink node may receive PRS transmissions from the plurality of nodes in a same symbol aligned within the same CP.

30 Claims, 15 Drawing Sheets

(51) Int. Cl.
*H04W 56/00* (2009.01)
*H04W 92/18* (2009.01)

(58) Field of Classification Search
CPC ............ H04W 56/003; H04W 56/0065; H04L 5/0051; H04L 5/0048
See application file for complete search history.

(56) References Cited

U.S. PATENT DOCUMENTS

2018/0231648 A1* 8/2018 Zhang .................. H04W 64/00
2023/0074373 A1* 3/2023 Jatunov ................ G01S 5/0244
2023/0228837 A1* 7/2023 Kazmi ................... G01S 5/021 455/456.1

* cited by examiner 105
212
Data Source
220
Transmit Processor
230
TX MIMO Processor
232a
MOD
DEMOD
234a
232t
234t
242
Memory
240
Controller
244
Scheduler
239
Data Sink
238
Receive Processor
236
MIMO Detector
252a
254a
DEMOD
MOD
252r
254r
256
MIMO Detector
258
Receive Processor
260
Data Sink
115
280
Controller
282
Memory
266
TX MIMO Processor
264
Transmit Processor
262
Data Source

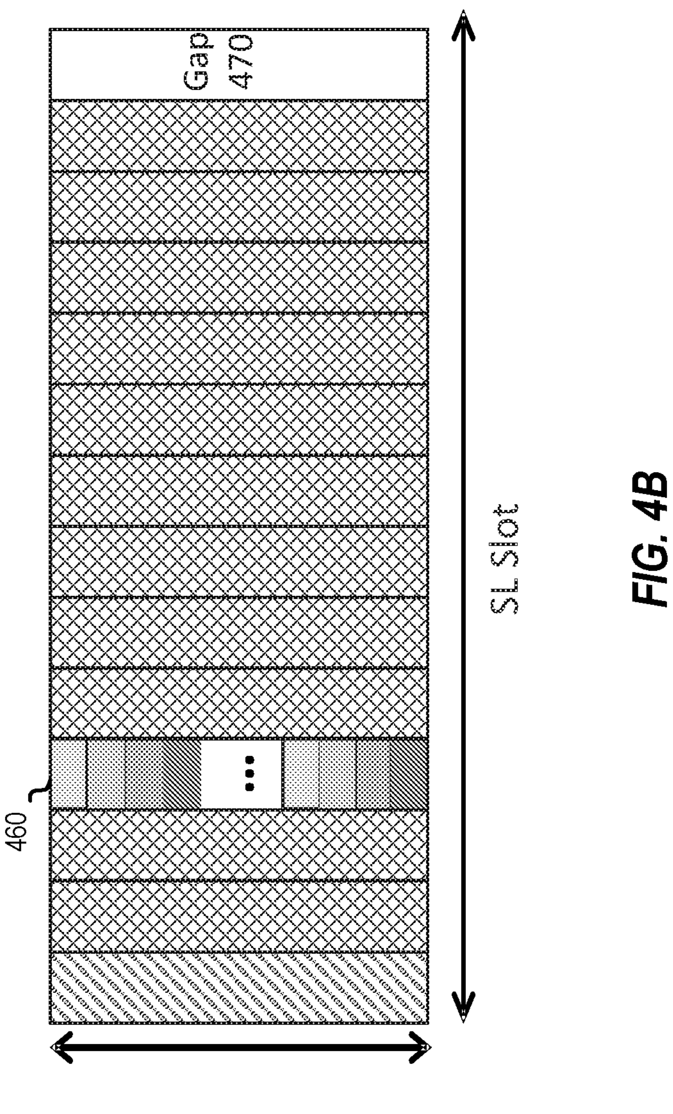
Gap
470
SL Slot
460
FIG. 4B
450

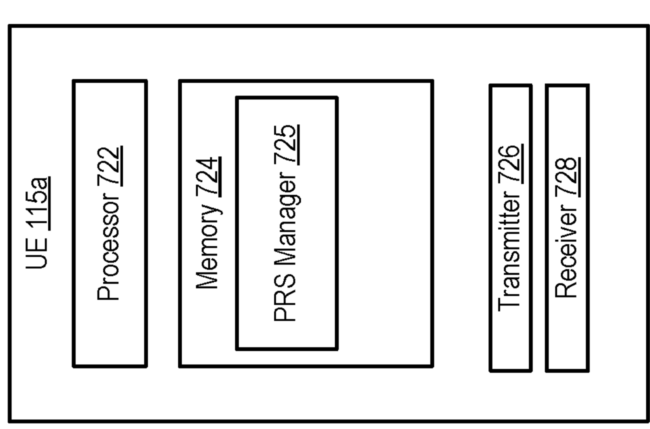
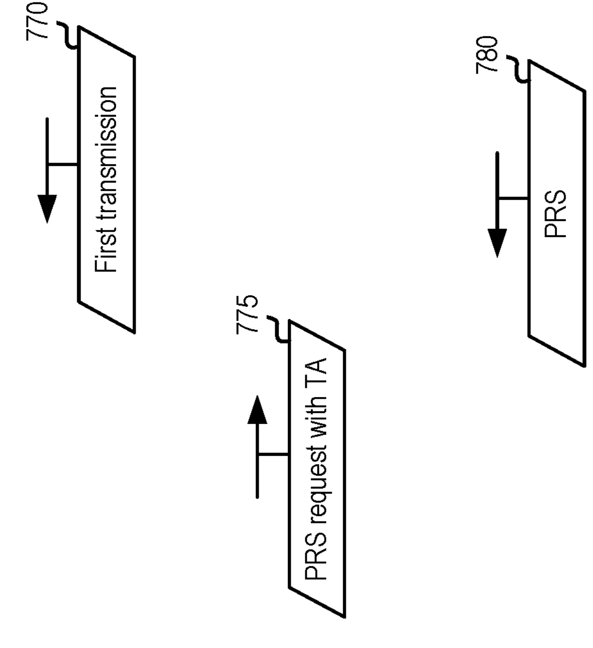
FIG. 7
700
UE 115x
Processor 702
Memory 704
TA Offset Manager 705
Transmitter 716
Receiver 718

TIMING ADVANCE ASSIGNMENT PROCEDURES FOR ALIGNING SIDELINK POSITIONING REFERENCE SIGNAL (PRS) RECEPTIONS AT TARGET USER EQUIPMENTS (UEs) OR ANCHOR (POS)-PEER UES

CROSS-REFERENCE TO RELATED APPLICATIONS

This application claims priority to Greece Patent Application No. 20210100414, entitled, "TIMING ADVANCE ASSIGNMENT PROCEDURES FOR ALIGNING SIDELINK POSITIONING REFERENCE SIGNAL (PRS) RECEPTIONS AT TARGET USER EQUIPMENTS (UES) OR ANCHOR (POS)-PEER UES," filed on Jun. 23, 2021, (2103246GR1) the disclosure of which is hereby incorporated by reference herein in its entirety as if fully set forth below and for all applicable purposes.

TECHNICAL FIELD

Aspects of the present disclosure relate generally to wireless communication systems, and more particularly, to sidelink positioning reference signal (PRS)-based position estimation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, by the UE, a plurality of first transmissions from a plurality of nodes, each first transmission of the plurality of first transmissions received by the UE from a respective node of the plurality of nodes at a respective time, obtaining, based on the respective times at which the first transmissions are received from each respective node of the plurality of nodes, at least one timing advance (TA) configuration for a sidelink (SL)-positioning reference signal (PRS) transmission to be transmitted from at least one node of the plurality of nodes to the UE, and transmitting the at least one TA configuration to the at least one node of the of the plurality of nodes.

In an additional aspect of the disclosure, a method of wireless communication performed by a UE includes transmitting, by the UE, at least one transmission to at least one node, each transmission of the at least one transmission transmitted by the UE to a respective node of the at least one node at a respective transmit time, obtaining by the UE, at least TA value to be used by the UE to transmit an SL-PRS to one or more nodes of the at least one node, and transmitting the SL-PRS to each of the one or more nodes using a respective TA value. In aspects, using the respective TA value includes advancing the transmission of the SL-PRS to the respective node by a time period equal to the TA value.

In an additional aspect of the disclosure, a UE includes at least one processor and a memory coupled to the at least one processor. The at least one processor stores processor-readable code that, when executed by the at least one processor, is configured to perform operations including receiving, by the UE, a plurality of first transmissions from a plurality of nodes, each first transmission of the plurality of first transmissions received by the UE from a respective node of the plurality of nodes at a respective time, obtaining, based on the respective times at which the first transmissions are received from each respective node of the plurality of nodes, at least one TA configuration for an SL-PRS transmission to be transmitted from at least one node of the plurality of nodes to the UE, and transmitting the at least one TA configuration to the at least one node of the of the plurality of nodes.

In an additional aspect of the disclosure, a UE includes at least one processor and a memory coupled to the at least one processor. The at least one processor stores processor-readable code that, when executed by the at least one processor, is configured to perform operations including transmitting, by the UE, at least one transmission to at least one node, each transmission of the at least one transmission transmitted by the UE to a respective node of the at least one node at a respective transmit time, obtaining by the UE, at least TA value to be used by the UE to transmit an SL-PRS to one or more nodes of the at least one node, and transmitting the SL-PRS to each of the one or more nodes using a respective TA value. In aspects, using the respective TA value includes advancing the transmission of the SL-PRS to the respective node by a time period equal to the TA value.

In an additional aspect of the disclosure, a non-transitory computer-readable medium stores instructions that, when executed by a processor, cause the processor to perform operations. The operations include receiving, by a UE, a plurality of first transmissions from a plurality of nodes, each first transmission of the plurality of first transmissions received by the UE from a respective node of the plurality of nodes at a respective time, obtaining, based on the respective times at which the first transmissions are received from each respective node of the plurality of nodes, at least one TA configuration for an SL-PRS transmission to be transmitted from at least one node of the plurality of nodes to the UE, and transmitting the at least one TA configuration to the at least one node of the of the plurality of nodes.

In an additional aspect of the disclosure, a non-transitory computer-readable medium stores instructions that, when executed by a processor, cause the processor to perform operations. The operations include transmitting, by a UE, at least one transmission to at least one node, each transmission of the at least one transmission transmitted by the UE to a respective node of the at least one node at a respective transmit time, obtaining by the UE, at least TA value to be used by the UE to transmit an SL-PRS to one or more nodes of the at least one node, and transmitting the SL-PRS to each of the one or more nodes using a respective TA value. In aspects, using the respective TA value includes advancing the transmission of the SL-PRS to the respective node by a time period equal to the TA value.

In an additional aspect of the disclosure, an apparatus includes means for receiving, by a UE, a plurality of first transmissions from a plurality of nodes, each first transmission of the plurality of first transmissions received by the UE from a respective node of the plurality of nodes at a respective time, means for obtaining, based on the respective times at which the first transmissions are received from each respective node of the plurality of nodes, at least one TA configuration for an SL-PRS transmission to be transmitted from at least one node of the plurality of nodes to the UE, and means for transmitting the at least one TA configuration to the at least one node of the of the plurality of nodes.

In an additional aspect of the disclosure, an apparatus includes means for transmitting by a UE, at least one transmission to at least one node, each transmission of the at least one transmission transmitted by the UE to a respective node of the at least one node at a respective transmit time, means for obtaining by the UE, at least TA value to be used by the UE to transmit an SL-PRS to one or more nodes of the at least one node, and means for transmitting the SL-PRS to each of the one or more nodes using a respective TA value. In aspects, the means for using the respective TA value include means for advancing the transmission of the SL-PRS to the respective node by a time period equal to the TA value.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4B is a diagram illustrating a PRS slot structure.

FIG. 7 is a block diagram of an example wireless communications system that supports managing transmissions of sidelink PRS with a timing advance offset from a sidelink node in a wireless communication system according to one or more aspects.

Like reference numbers and designations in the various drawings indicate like elements.

DETAILED DESCRIPTION

Figure 1:
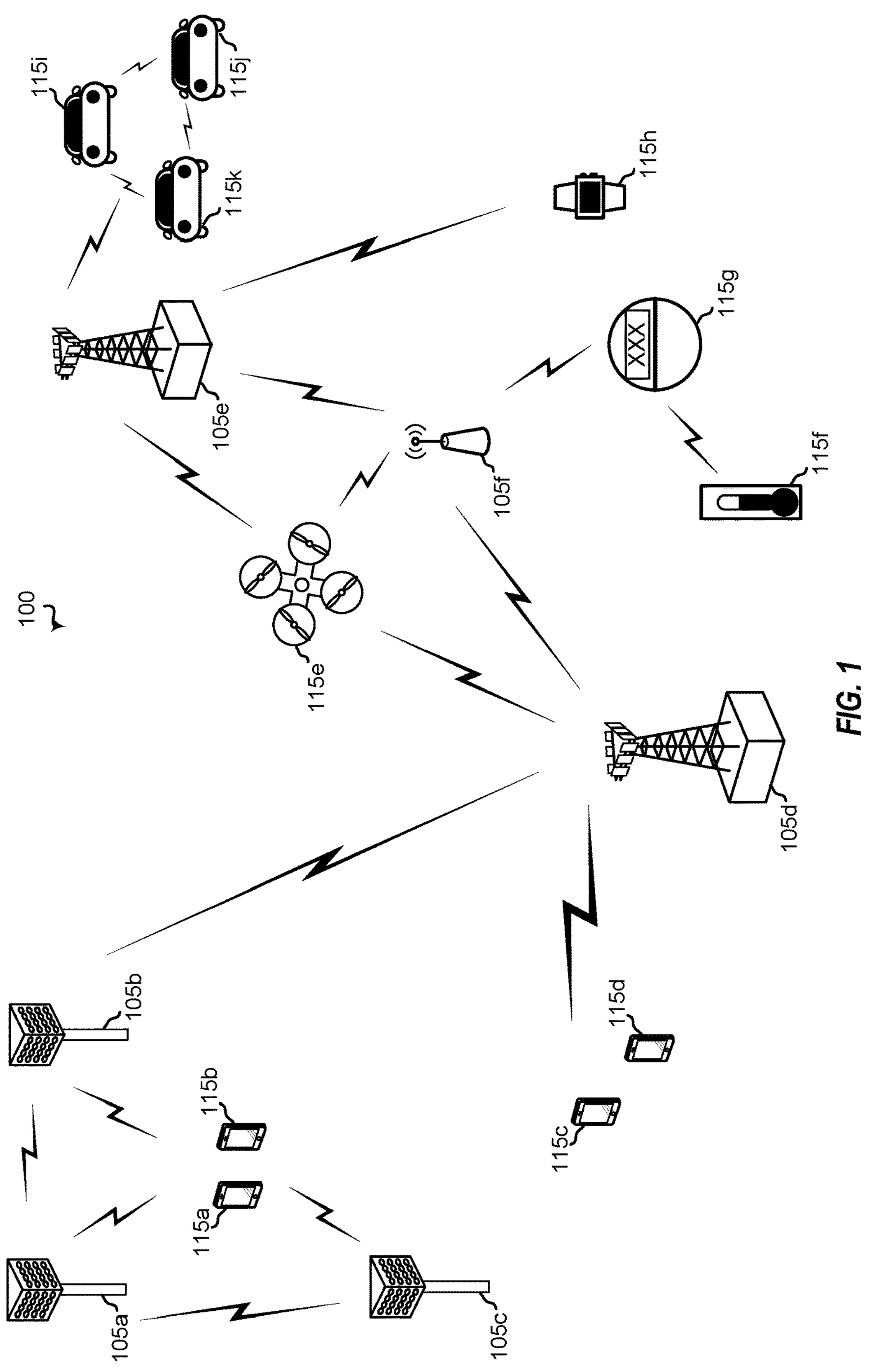
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects of the present disclosure relate to techniques that provide a mechanism for managing transmissions of sidelink positioning reference signals (PRS) with a timing advance offset from a sidelink node. In aspects, a sidelink node (e.g., a target user equipment (UE) or an assisting UE) may receive transmissions from a plurality of nodes (e.g., target UEs or assisting UEs), where each transmission is transmitted at a respective transmission time and received at a respective reception time. In aspects, the sidelink node may determine and/or obtain a timing advance offset to be applied to a transmission of a PRS from a respective sidelink node of the plurality of nodes with respect to the respective time at which the previous transmission was transmitted and/or received from the respective sidelink node. In aspects, the timing advance offset may be determined so that, when the sidelink node receives the PRS transmissions from the plurality of sidelink nodes, the PRS transmissions are aligned. For example, the sidelink node may determine a first timing advance offset to be applied to a PRS transmission to be transmitted by a first sidelink node of the plurality of nodes. This first timing advance may be an offset relative to the time at which the first sidelink node transmitted the previous transmission. The sidelink node may determine a second timing advance offset to be applied to a PRS transmission to be transmitted by a second sidelink node of the plurality of nodes. This second timing advance may be an offset relative to the time at which the second sidelink node transmitted the previous transmission to the sidelink node. In some aspects, the first timing advance offset may be different from the second timing advance offset. In aspects, the sidelink node may request a transmission of a PRS from the plurality of nodes, and the request to each respective sidelink node may include an indication of the timing advance offset to be applied to the PRS transmission from the respective sidelink node. The sidelink node may receive the PRS transmissions from the plurality of nodes and the reception may include receiving the PRS transmissions in a same symbol aligned within the same CP.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology.

Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 millisecond (ms)), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f*** is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices;

consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs **115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100**.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (COMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
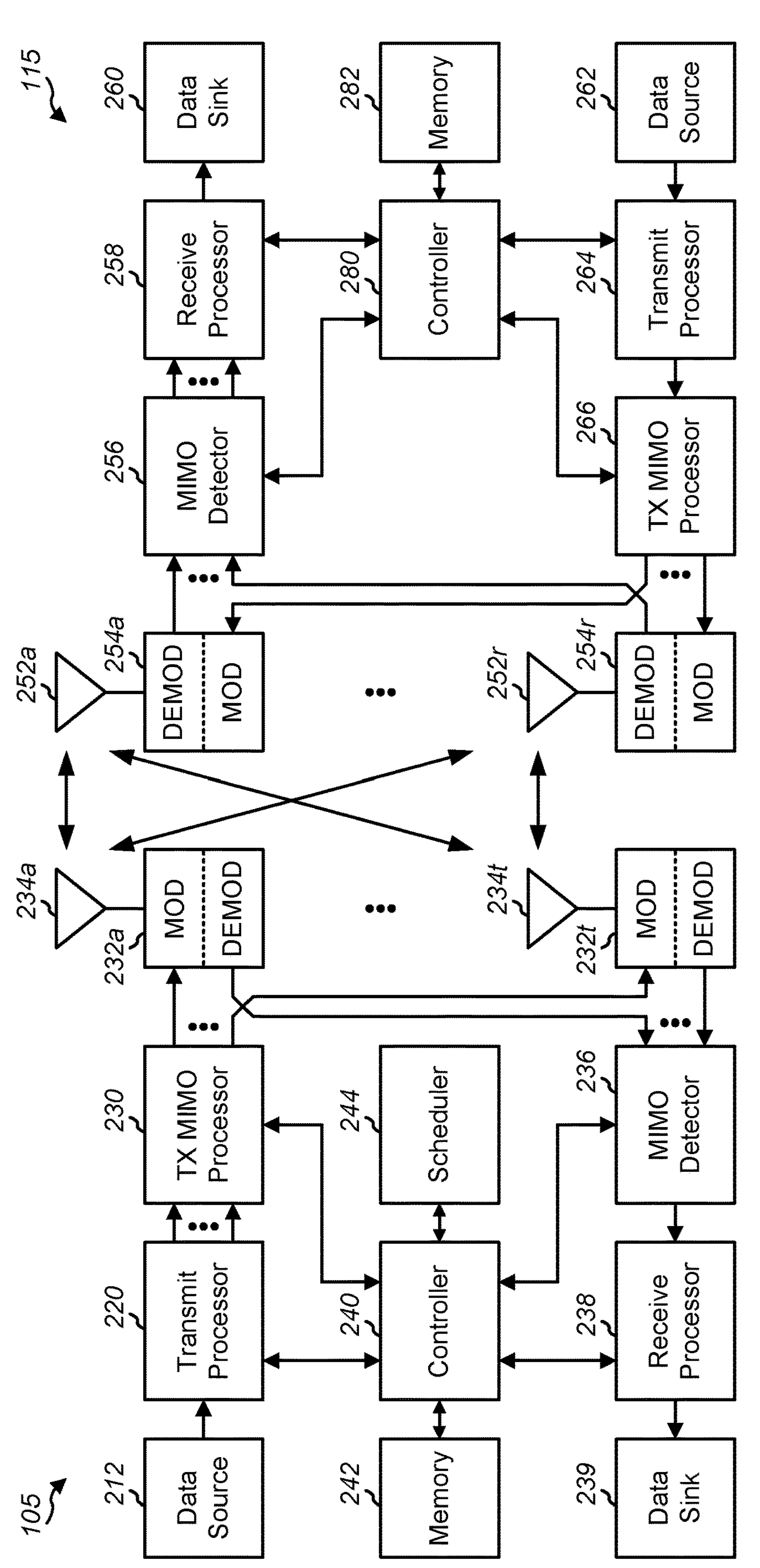
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal.

Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Existing wireless communication systems rely on a position or location of user equipment (UE) within the network when providing communication services. The UE's location within the network may be determined using a variety of techniques. In implementations, a positioning reference signals (PRS) may be used to facilitate estimating the position of a device. In some implementations, a PRS may include any of a PRS, a cell specific reference signal (CRS), a sounding reference signal (SRS), a demodulation reference signal (DMRS), etc.

In one example positioning technique, which may be called a multi-cell round-trip-time (RTT) technique, a UE's position may be determined based on a difference in the RTT of a PRS between the UE and a number of base stations. In this RTT technique, the difference between the RTT from the UE to a first base station, and the RTT from the UE to a second base station may be used to determine the UE's location. In some examples, the RTT timing differences may be reported to a specific network entity (e.g., a location management function (LMF)), which may determine the UE's location based on the reported timing differences.

In another positioning technique, called the time difference of arrival (TDOA) technique, a time difference between a PRS received from a plurality of base stations may be used to determine the UE's location. In this TDOA technique, a PRS may be received by the UE from each of the plurality of base stations, or from each transmission and reception point (TRP) of a cell. The UE measures the time offset between the arrival of each PRS from the different base stations. The time offset indicates a TDOA of each PRS. This TDOA of each PRS may be used, along with known locations of the base stations transmitting the PRSs, to determine the UE's location. In some examples, the timing measurements (e.g., the difference of arrivals for the different PRSs) may be reported to an LMF network entity, which may determine the UE's location and then report the UE's location to the UE.

Another positioning technique that may be used may be uplink TDOA. In uplink TDOA, a sounding reference signal (SRS) may allow each base station to measure a relative time of arrival (RTOA) on uplink transmissions from the UE, and the base station may report the measurements to an LMF network entity, which may determine the UE's location and then report the UE's location to the UE.

Yet another technique that may be used may include downlink angle of departure (AoD). In downlink AoD, the UE measures the downlink reference signal receive power (RSRP) per beam for each of base station. The UE may then report the measurements to an LMF network entity, which may be used to determine the AoD based on the UE beam location for each of the base stations. The LMF network entity may determine the UE's location based on the determined AoDs and may then report the UE's location to the UE.

Another technique that may be used for determining a UE's position may be uplink angle-of-arrival (AoA). In uplink AoA, a base station measures the AoA based on a beam in which the UE is located. The base stations then reports the measurements to the LMF network entity, which may determine the UE's location and then report the UE's location to the UE.

It has been proposed to implement UE-initiated and/or network-initiated on-demand downlink PRS techniques in current wireless communication systems. In these cases, a downlink PRS may be requested and may be used, in conjunction with any of the above techniques, for determining a UE's position. In addition, other proposals include performing UE's positioning based on a radio resource control (RRC) status of the UE. For example, for a UE in RRC inactive status, downlink-only, uplink-only, or uplink+downlink positioning may be performed. In some other proposals, an access point may be used to transmit a downlink PRS to the UE, which may be used for UE's positioning determinations. In addition, aggregation of downlink PRS signals across frequencies may be used.

In particular implementations, use of sidelink positioning techniques may enhance any legacy and or traditional positioning approaches. In these cases, an assisting UE (e.g., an anchor UE or a relay UE) may be used to provide assistance in determining a target UE's position (e.g., based on PRS transmissions over the sidelink). It is noted that as used herein, a target UE may be a UE for which a position estimation is to be performed or determined. Additionally, as used herein, an assisting UE may be a UE whose position is known (or can be known) to the assisting UE, and which may have a sidelink connection with the target UE (or in some cases a sidelink connection with another assisting UE that has a sidelink connection with the target UE). In some aspects, an assisting UE may be an anchor or a relay UE that may have a direct uplink with a base station. Furthermore, as used herein, positioning services may include facilitating a position estimation such as by transmission and/or reception of a PRS, and/or measurements on the PRS to facilitate the position estimation.

One particular scenario in which sidelink positioning may be used may include a situation in which an assisting UE may provide an additional anchor for the target UE over a sidelink. For example, where the target UE may be within UL and DL coverage of at least one base station, and thus be able to receive and transmit a PRS to the at least one base station, the target UE may be able to receive positioning services from the base stations (e.g., where the base stations may serve as anchor points for determining the target UE's position according to any of the techniques discussed above), and may be able to utilize the assisting UE as an additional anchor point for transmitting and receiving PRS for even more accurate position estimation.

Figure 3A:
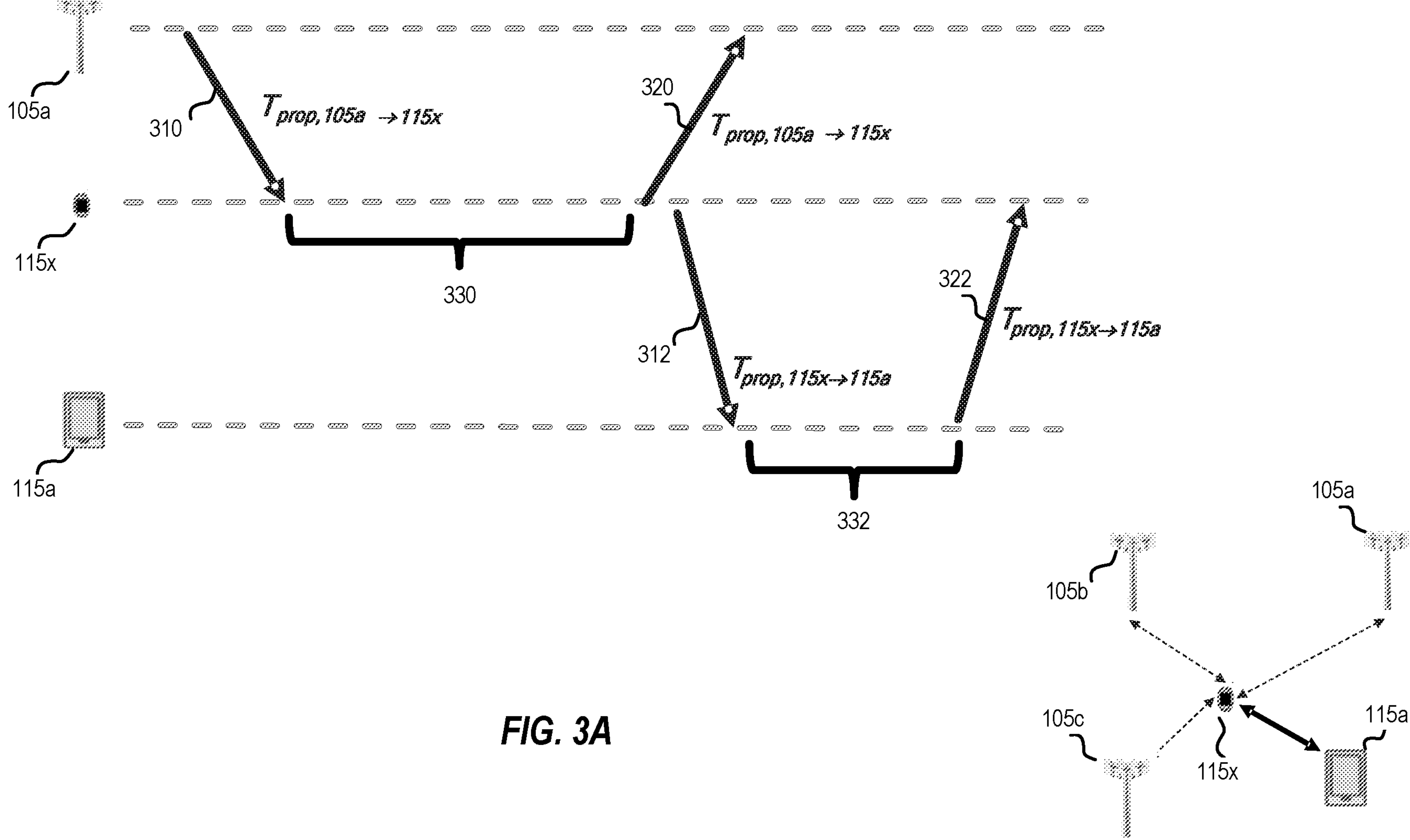
FIG. 3A is a diagram illustrating a round trip time (RTT) procedure using sidelink-assisted positioning.

An example of a scenario in which an assisting UE may provide an additional anchor for the target UE over a sidelink is illustrated in FIG. 3A. FIG. 3A is a diagram illustrating an example of a sidelink-assisted positioning procedure using an assisting UE as an additional anchor. In particular, FIG. 3A illustrates an RTT procedure using sidelink-assisted positioning. As shown in FIG. 3A, target UE 115*x* may receive positioning services (e.g., transmission/reception of PRS) from base stations 105*a-c*, and may be in sidelink communication with assisting UE 115*a*. In this example, assisting UE 115*a* may serve as an additional anchor point for target UE 115*x*. In this case, as illustrated, target UE 115*x* may receive a PRS transmission 310 from base station 105*a* (although the same procedure may be applied to any of the other anchor base stations and target UE 115*x* may receive a PRS from any of the other anchor base stations). Target UE 115*x* may perform measurements 330 based on PRS transmission 310 and may transmit measurement report 320 based on measurements 330 to base station 105*a*. Base station 105*a* may receive the RTT measurements, which may be used to estimate the position of target UE 115*x*. In this example, assisting UE 115*a* may be used as an additional anchor point and target UE 115*x* may transmit PRS transmission 312 to assisting UE 115*a*. Assisting UE 115*a* may perform measurements 332 based on PRS transmission 312 and may transmit measurement report 322 based on measurements 332 to target UE 115*x*. Measurement report 322 may be used, e.g., in addition to measurement report 320, to estimate the position of target UE 115*x* based on measurements 330 and 332. In this manner, the additional RTT measurements from assisting UE 115*a* may be used as additional measurement for estimating the position of target UE 115*x*.

Figure 3B:
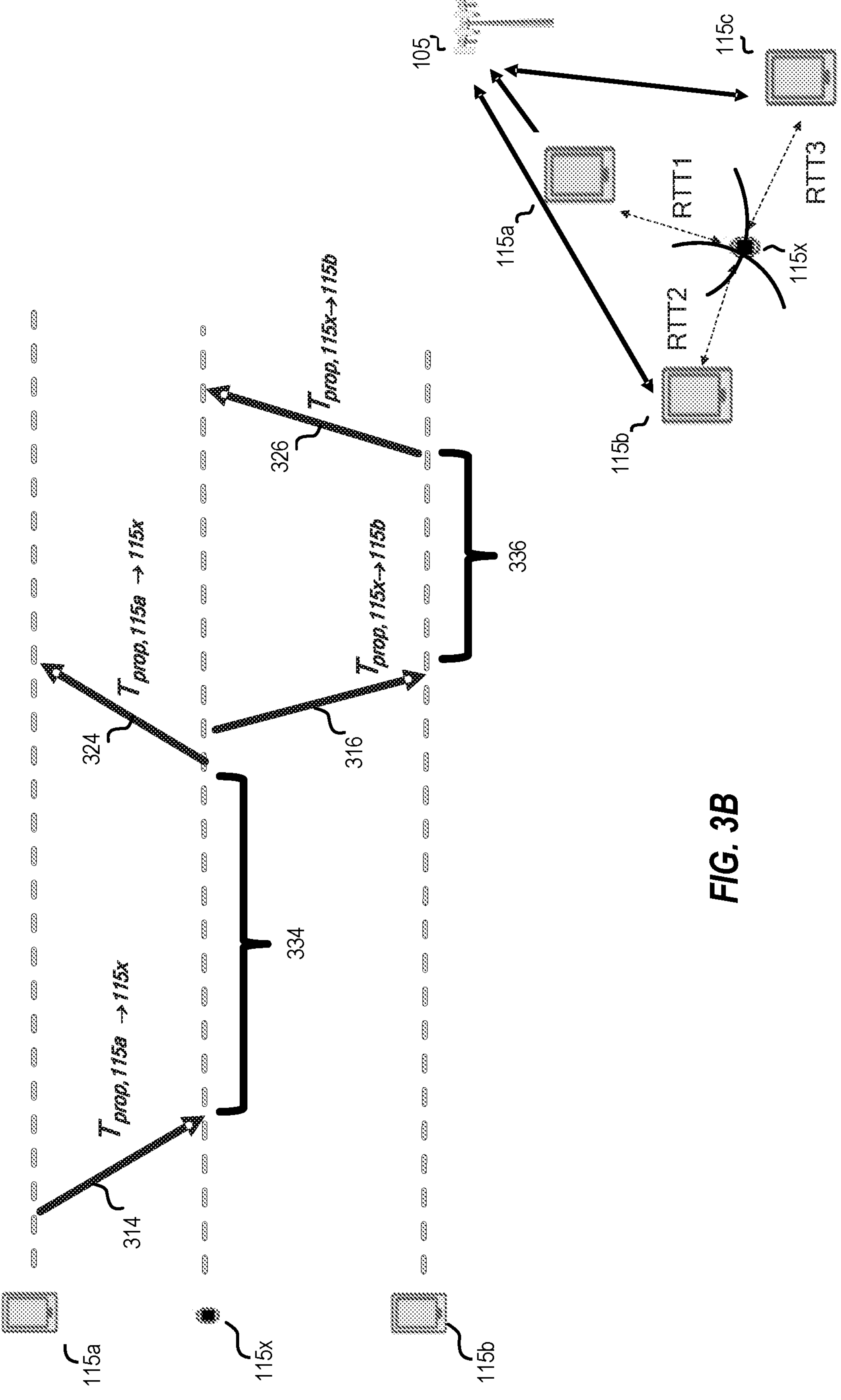
FIG. 3B is a diagram illustrating an example of a sidelink-assisted positioning procedure using assisting user equipments (UEs) and no anchor base stations.

In another scenario in which sidelink positioning may be used, a target UE may not be within either UL and DL coverage of at least one base station and thus may not be able to receive or transmit PRS from/to the at least one base station, but may be within sidelink coverage of one or more assisting UEs. In this case, the target UE may be able to receive positioning services (e.g., PRS) only from the assisting UEs, as there are no base stations within coverage for receiving positioning services. This scenario is illustrated in FIG. 3B. FIG. 3B is a diagram illustrating an example of a sidelink-assisted positioning procedure using assisting UEs and no anchor base stations. In particular, FIG. 3B illustrates an RTT procedure using sidelink-assisted positioning. As shown in FIG. 3B, target UE 115*x* may not be within uplink or downlink coverage of base station 105. However, target UE 115*x* may be within sidelink coverage of assisting UEs 115*a-c*. In this case, target UE 115*x* may receive positioning services (e.g., transmission/reception of PRS) from any of assisting UEs 115*a-c*, even though target UE 115*x* may not be able to transmit/receive PRS to/from base station 105. As shown in FIG. 3B, assisting UEs 115*a-c* may be in communication with base station 105. In this example, any of assisting UEs 115*a-c* may serve as a positioning anchor points for target UE 115*x*. In this case, as illustrated, target UE 115*x* may receive a PRS transmission 314 from assisting UE 115*a* over a sidelink between target UE 115*x* and assisting UE 115*a*. Target UE 115*x* may perform measurements 334 based on PRS transmission 314 and may transmit measurement report 324 based on measurements 334 to assisting UE 115*a*. Assisting UE 115*a* may receive the RTT measurements, which may be used to estimate the position of target UE 115*x*. In this example, target UE 115*x* may also transmit PRS transmission 316 to assisting UE 115*b* over a sidelink between target UE 115*x* and assisting UE 115*b*. Assisting UE 115*b* may perform measurements 336 based on PRS transmission 316 and may transmit measurement report 326 based on measurements 336 to target UE 115*x*. Measurement report 326 may be used, e.g., in addition to measurement report 324, to estimate the position of target UE 115*x* based on measurements 334 and 336. In this manner, the position of target UE 115*x* may be estimated even though target UE 115*x* may not be within coverage of a base station.

In yet another scenario in which sidelink positioning may be used, a target UE may be within DL coverage of at least one base station, but without UL coverage of at least one base station. In this case, the target UE may be able to receive a PRS from the at least one base station, but may not be able to transmit a PRS to the at least one base station. In this case, the target UE may be in sidelink coverage of at least one assisting UE. The assisting UEs may assist in the estimation of the target UE's position by functioning as a relay (e.g., to relay the uplink PRS) and/or by functioning as a positioning anchor over the sidelink. This scenario is illustrated in FIGS. 3C and 3D.

Figures 3C, 3D:
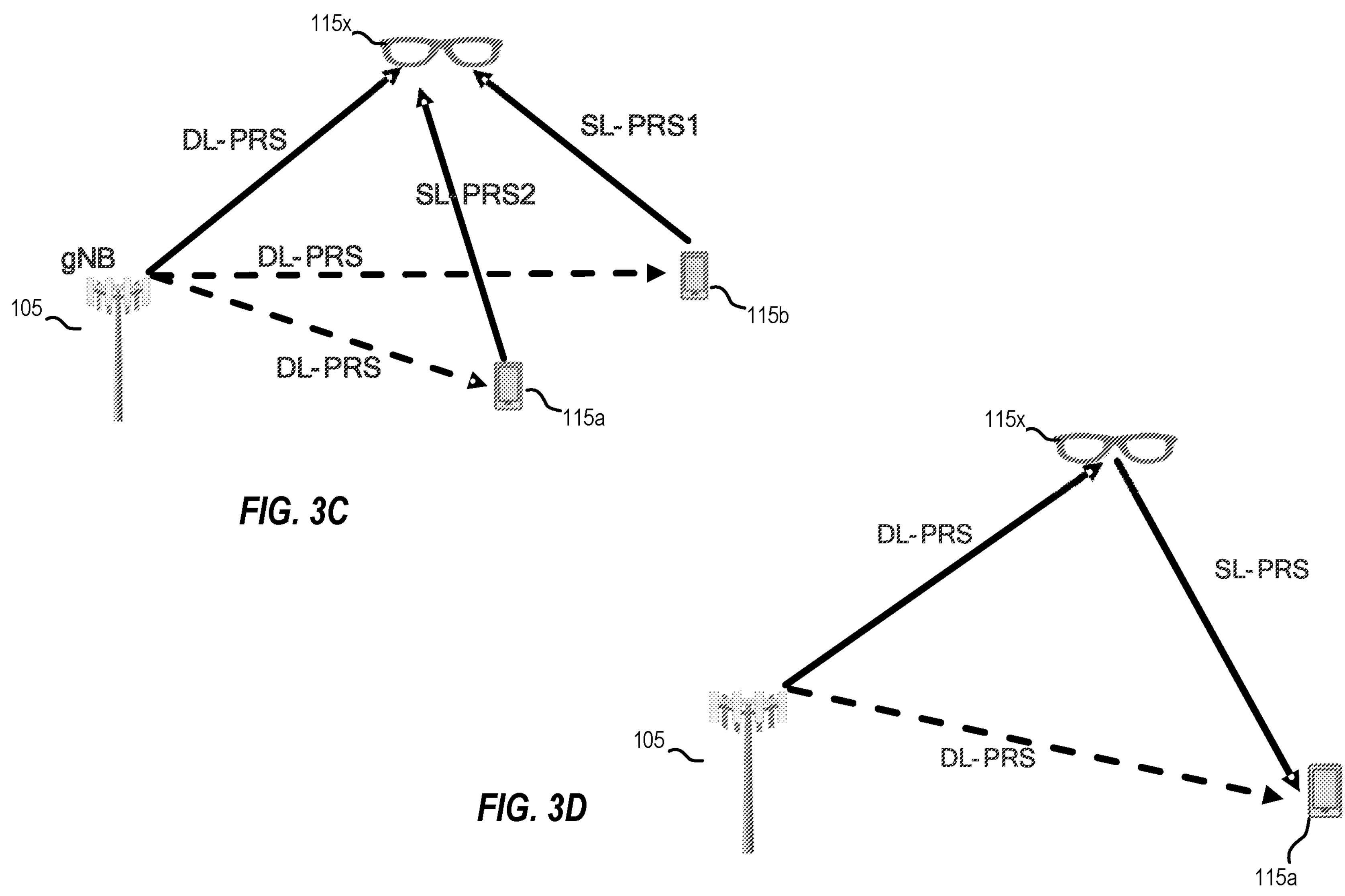
FIG. 3C is a diagram illustrating an example of a sidelink-assisted positioning procedure with multiple assisting UEs and no uplink with a base station.
FIG. 3D is a diagram illustrating an example of a sidelink-assisted positioning procedure with a single assisting UEs and no uplink with a base station.

FIG. 3C is a diagram illustrating an example of a sidelink-assisted positioning procedure with multiple assisting UEs and no uplink with a base station. In particular, as shown in FIG. 3C, target UE 115*x* may have a downlink connection with base station 105 but no uplink, and may be in sidelink communication with assisting UEs 115*a* and 115*b*. In this example, the position of target UE 115*x* may be estimated using measurements of downlink PRS transmissions from base station 105*a* to target UE 115*x*, and using measurements of sidelink PRS transmissions from target UE 115*x* to assisting UEs 115*a* and 115*b*, and sidelink PRS transmissions to target UE 115*x* from assisting UEs 115*a* and 115*b*. In this case, no SRS transmissions may be needed from base station to UE 115*x*.

FIG. 3D is a diagram illustrating an example of a sidelink-assisted positioning procedure with a single assisting UEs and no uplink with a base station. In particular, as shown in FIG. 3D, target UE 115*x* may have a downlink connection with base station 105 but no uplink, and may be in sidelink communication with a single assisting UEs 115*a*. In this example, the position of target UE 115*x* may be estimated using measurements of downlink PRS transmissions from base station 105*a* to target UE 115*x*, and using measurements of sidelink PRS transmissions from target UE 115*x* to assisting UE 115*a*, and sidelink PRS transmissions to target UE 115*x* from assisting UE 115*a*. In this case, two additional measurements than the multiple assisting UEs scenario illustrated in FIG. 3C may be provided. One of the additional measurements may be a time difference between reception of a downlink reference signal from base station 105 and transmission of a sidelink reference signal to assisting UE 115*a*. Another of the additional measurements may be a time difference between reception of a downlink reference signal from base station 105 and reception of a sidelink reference signal from assisting UE 115*a*.

Transmission of references signals (e.g., PRS) over the sidelink between a target UE and assisting UEs may take place in transmission or reception resource pools. Indeed, sidelink transmissions in general may be performed over these transmission or reception resource pools. In implementations, a minimum resource allocation unit includes a sub-channel in the frequency domain, and one slot in the time domain. A resource pool may include a number of resource allocation units. In some implementations, some slots of a resource pool may not be available for sidelink transmissions, and some slots may contain feedback resources. In implementations, a resource pool may be configured by RRC configuration and may be based on a pre-configuration (e.g., the UE may store the pre-configuration), or may be based on an indication from a base station (e.g., the resource pool configuration of the UE may be received and/or signaled by a base station).

Figure 4A:
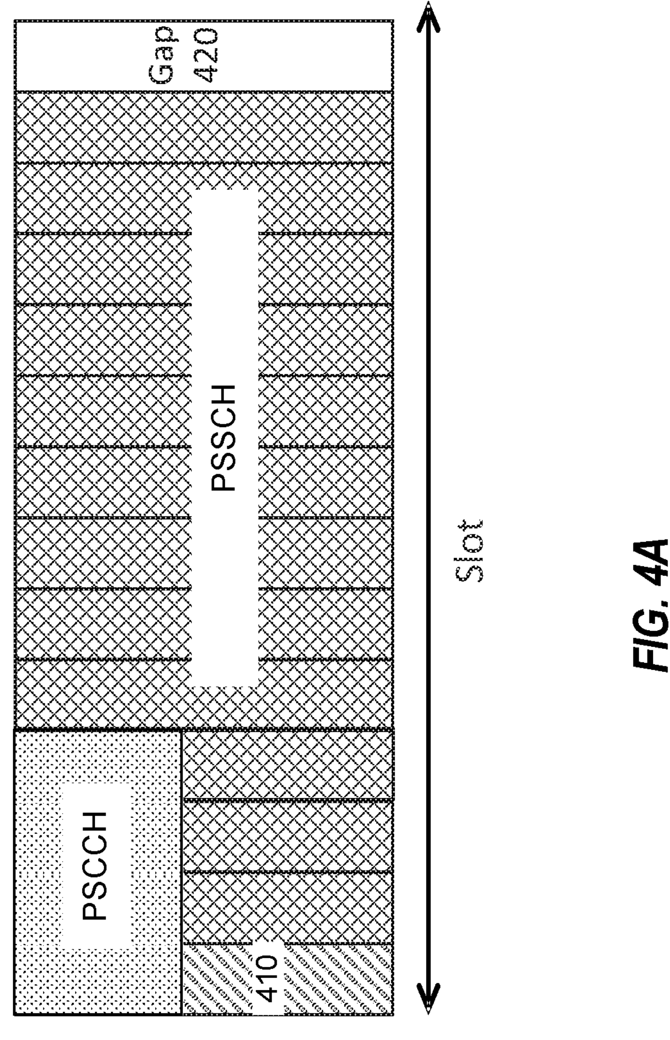
FIG. 4A is a diagram illustrating a slot structure of a resource pool.

FIG. 4A is a diagram illustrating a slot structure 400 of a resource pool. As can be seen, the slot structure of a resource pool may generally include 14 OFDM symbols. In some implementations, sidelink communication within a slot may be configured (e.g., by pre-configuration) to occupy fewer than 14 symbols. In implementations, a physical sidelink control channel (PSCCH) transmission may occupy a portion of the slot symbols, and the physical sidelink shared channel (PSSCH) transmission may occupy another portion of the slot symbols. In some cases, The first symbol 410 may be repeated on the preceding symbol for automatic gain control (AGC) settling. In some cases, a gap symbol 420 may be provided after the PSSCH symbols. Sub-channel size may be configured (e.g., by pre-configuration) to a value from a set that includes {10, 15, 20, 25, 50, 75, 100} physical resource blocks (PRBs). PSCCH and PSSCH may be always transmitted in the same slot.

As noted above, a sidelink PRS may be transmitted over a sidelink in a resource pool. FIG. 4B is a diagram illustrating a PRS slot structure 450. In particular, sidelink UEs may transmit and/or receive a sidelink PRS 460 in a PRS slot of a resource pool for positioning (RP-P). In an RP-P, PRS 460 may include resources for PRS transmission from the various sidelink UEs. In implementations, a sidelink PRS may be transmitted using a comb-based pattern for fast Fourier transform (FFT)-based processing at the receiving UE. The sidelink PRS may also be an un-staggered downlink PRS or may be a partially staggered PRS for small range/TOA uncertainty, which may allow use with loose synchronization and may reduce collisions between different sidelink transmissions. The sidelink PRS may also be a symbol-based resource-pool specific sidelink PRS in order to enable a wideband and periodic opportunity for sidelink PRS transmission and reception across multiple UEs decoupled from the PSSCH/CSI-RS allocation. The sidelink PRS may also be implemented using intra-slot repetition in order to combine gains when required, and to perform receiver sweeping (such as in FR2). The sidelink PRS may also be implemented using inter-UE coordination of RP-P so that dynamic PRS and data multiplexing may be implemented while minimizing sidelink PRS collisions.

In some aspects, a resource pool specific sidelink PRS may be implemented. For example, a network device (e.g., a base station and/or a UE) may assign to another device, one or more configurations of the RP-P. In these cases, the configuration for each RP-P may specify an offset, periodicity, number of consecutive symbols within a slot (e.g., as small as one symbol), a bandwidth within a component carrier (CC) (or a bandwidth across multiple CCs), etc. Each RP-P may be associated with a zone or a distance from a reference location. In some cases, a UE (e.g., a target UE and/or an assisting UE) may request one or more RP-P configurations, and the UE may include in the request one or more of: a location or zone ID, a periodicity, a bandwidth, an offset, a number of symbols, an indication of whether a configuration with "low interference" is needed (e.g., may be indicated and/or determined based on an assigned quality of service (QOS) or priority)).

Figure 5:
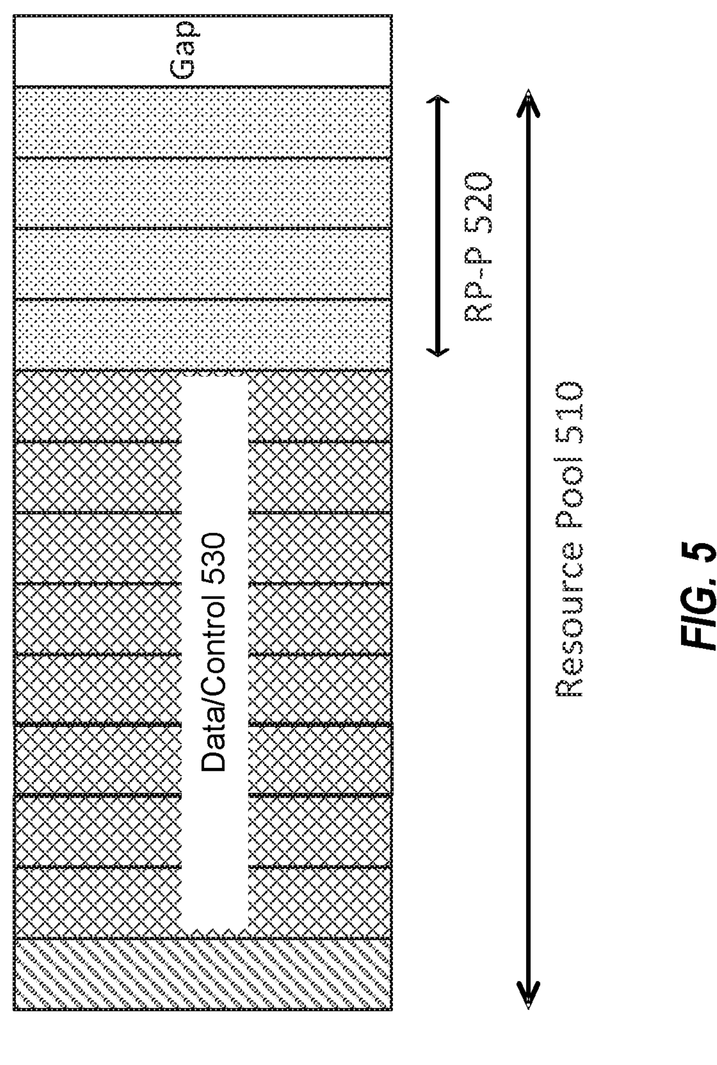
FIG. 5 is a diagram showing an example of a rate matching configuration of a sidelink resource pool.

A network device (e.g., a base station and/or a UE) may configure rate matching resources or RP-P for rate matching/muting to a sidelink UE such that when a collision exists between the assigned resources and another resource pool which contains data/control (e.g., DMRS or CSI-RS data), the sidelink UE may be expected to rate match/muting/puncture the data/DMRS/CSI-RS within the colliding resources. In aspects, this may enable orthogonalization between positioning and data transmissions for increased coverage of PRS signals. FIG. 5 is a diagram showing an example of a rate matching configuration of a sidelink resource pool. In particular, configuration 500 may specify a configuration for RP-P 520, and for resource pool 510. As can be seen, RP-P 520 and resource pool 510 may collide over the duration of RP-P. In this case, configuration 500 may specify a region for data/control 530 in which data/DMRS/CSI-RS/control may be transmitted, no data/control may be transmitted over any of the symbols of RP-P 520, due to the collision between resource pool 510 and RP-P 520.

In sidelink positioning implementations, when a sidelink UE (either an assisting UE or a target UE) receives a sidelink PRS transmission that includes PRSs from multiple UEs multiplexed (e.g., FDM'ed) together, the reception timing of the sidelink PRSs from the multiple UEs may not be aligned. For example, where the sidelink PRSs from the multiple UEs are configured in a same symbol, the symbols received from the multiple UEs may not be within the same cyclic prefix (CP). In this case, performance degradation may occur as this situation may cause inter-symbol interference. Misalignment of the reception timing of the sidelink PRSs from the multiple UEs may occur when a receiving UE is in a location that is far away from a first transmitting UE and very close to a second transmitting UE. In this case, the sidelink PRSs received (FDM'ed) from the first and second assisting UEs may be misaligned. In another scenario, misalignment of the reception timing of the sidelink PRSs from the multiple UEs may occur when the receiving UE is synchronized with a first source (e.g., a base station, sidelink UE, GNSS, etc.), and the transmitting UEs are synchronized with a second source different from the first source. In this case, the sidelink PRSs received from the transmitting UEs may be misaligned with the timing of the receiving UE.

Figure 6B:
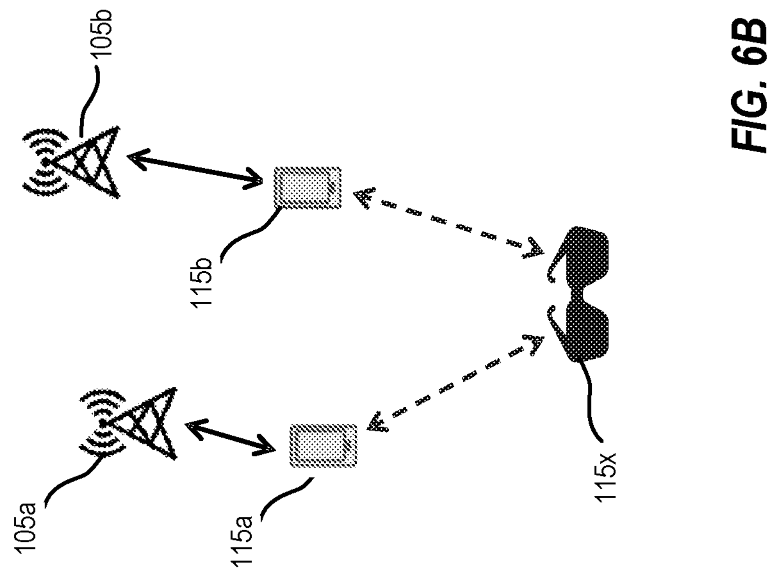
FIG. 6B is a diagram illustrating an example of a misaligned reception timing of a PRS transmission due to different synchronization sources.
Figure 6A:
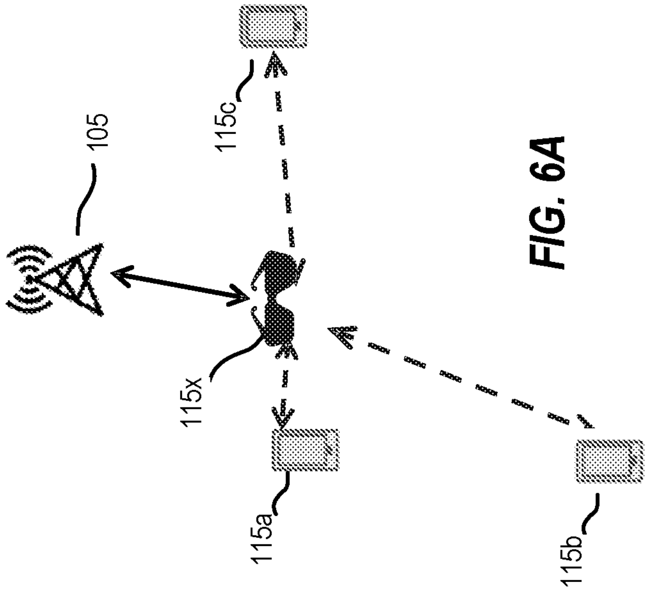
FIG. 6A is a diagram illustrating an example of a misaligned reception timing of a PRS transmission due to distance differential.

FIG. 6A is a diagram illustrating an example of a misaligned reception timing of a PRS transmission due to distance differential. In particular, assisting UE 115*a* may be very close to target UE 115*x*, while assisting UE 115*c* is far away, and assisting UE 115*b* is even farther away. In this scenario, if the PRS transmissions from assisting UEs 115*a-c* (or any subset thereof) are multiplexed together, when the PRS transmissions are received at target UE 115*x*, the receptions may be misaligned as described above. The same problem may arise where UE 115*x* is an assisting UE and UEs 115*a-c* are target UEs. In this case, target UEs 115*a-c* may transmit PRSs, which may be multiplexed together and received at assisting UE 115*x*, but the reception timing of the multiplexed PRSs may be misaligned as described above.

FIG. 6B is a diagram illustrating an example of a misaligned reception timing of a PRS transmission due to different synchronization sources. In particular, assisting UE 115*a* may be synchronized based on base station 105*a*, while assisting UE 115*b* may be synchronized based on base station 105*b*, which may be different from base station 105*a*. In this case, if the PRS transmissions from assisting UEs 115*a* and 115*b* are multiplexed together, when the PRS transmissions are received at target UE 115*x*, the receptions may be misaligned as described above. The same problem may arise when an assisting UE receives multiplexed PRS transmissions from target UEs that are synchronized from different synchronization sources. In this case, the assisting UE may receive the multiplexed PRS transmissions with a timing misalignment.

Various aspects of the present disclosure relate to techniques that provide a mechanism for managing transmissions of sidelink PRS with a timing advance offset from a sidelink node. In aspects, a sidelink node (e.g., a target UE or an assisting UE) may receive transmissions from a plurality of nodes (e.g., target UEs or assisting UEs), where each transmission is transmitted at a respective transmission time and received at a respective reception time. In aspects, the sidelink node may determine and/or obtain a timing advance offset to be applied to a transmission of a PRS from a respective sidelink node of the plurality of nodes with respect to the respective time at which the previous transmission was transmitted and/or received from the respective sidelink node. In aspects, the timing advance offset may be determined so that, when the sidelink node receives the PRS transmissions from the plurality of sidelink nodes, the PRS transmissions are aligned. For example, the sidelink node may determine a first timing advance offset to be applied to a PRS transmission to be transmitted by a first sidelink node of the plurality of nodes. This first timing advance may be an offset relative to the time at which the first sidelink node transmitted the previous transmission. In this example, the sidelink node may determine a second timing advance offset to be applied to a PRS transmission to be transmitted by a second sidelink node of the plurality of nodes. This second timing advance may be an offset relative to the time at which the second sidelink node transmitted the previous transmission to the sidelink node. In some aspects, the first timing advance offset may be different from the second timing advance offset. In aspects, the sidelink node may request a transmission of a PRS from the plurality of nodes, and the request to each respective sidelink node may include an indication of the timing advance offset to be applied to the PRS transmission from the respective sidelink node. The sidelink node may receive the PRS transmissions from the plurality of nodes and the reception may include receiving the PRS transmissions in a same symbol aligned within the same CP.

FIG. 7 is a block diagram of an example wireless communications system 700 that supports managing transmissions of sidelink PRS with a timing advance offset from a sidelink node in a wireless communication system according to one or more aspects. In some examples, wireless communications system 700 may implement aspects of wireless network 100. Wireless communications system 700 includes UE 115*x* and UE 115*a*. In aspects, UE 115*x* and UE 115*a* may be in communication over a sidelink. Either UE 115*x* and/or UE 115*a* may also each be in communication with a base station (not shown). In the discussion that follows, UE 115*x* may be described as a target UE and UE 115*a* may be described as an assisting UE, and in this context, the PRS transmissions between the UEs may be for estimating a position of UE 115*x*. In addition, UE 115*x* may be described as a UE requesting and/or receiving a PRS transmission from UE 115*a* with a timing advance offset in accordance with aspects of the present disclosure. However, it should be noted that, the techniques for requesting and/or sending a PRS transmissions with a timing advance offset may apply equally when UE 115*a* is the node requesting and/or receiving the PRS transmissions from UE 115*x*. As such, the description herein should not be construed as limiting in any way. Also, it is noted that the description of system 700 as including two UEs is merely for illustrative purposes and not intended to be limiting in any way. As such, wireless communications system 700 may generally include more than two UEs 115.

UE 115*x* may include a variety of components (such as structural, hardware components) used for carrying out one or more functions described herein. For example, these components may include one or more processors 702 (hereinafter referred to collectively as "processor 702"), one or more memory devices 704 (hereinafter referred to collectively as "memory 704"), one or more transmitters 716 (hereinafter referred to collectively as "transmitter 716"), and one or more receivers 718 (hereinafter referred to collectively as "receiver 718"). Processor 702 may be configured to execute instructions stored in memory 704 to perform the operations described herein. In some implementations, processor 702 includes or corresponds to one or more of receive processor 258, transmit processor 264, and controller 280, and memory 704 includes or corresponds to memory 282.

Memory 704 includes or is configured to store timing advance offset manager 705. In aspects, timing advance offset manager 705 may be configured to perform operations for obtaining and/or determining a timing advance offset to be used in a sidelink PRS transmission from a sidelink UE to UE 115*x*. As such, each timing advance offset may be associated with a sidelink UE. In aspects, the timing advance offset may be determined relative to a timing of a previous transmission received by UE 115*x* from the sidelink UE associated with the timing advance offset.

Transmitter 716 is configured to transmit reference signals, control information and data to one or more other devices, and receiver 718 is configured to receive references signals, synchronization signals, control information and data from one or more other devices. For example, transmitter 716 may transmit signaling, control information and data to, and receiver 718 may receive signaling, control information and data from, base station 105. In some implementations, transmitter 716 and receiver 718 may be integrated in one or more transceivers. Additionally or alternatively, transmitter 716 or receiver 718 may include or correspond to one or more components of UE 115 described with reference to FIG. 2.

UE 115*a* also may include a variety of components (such as structural, hardware components) used for carrying out one or more functions described herein. For example, these components may include one or more processors 722 (hereinafter referred to collectively as "processor 722"), one or more memory devices 724 (hereinafter referred to collectively as "memory 724"), one or more transmitters 726 (hereinafter referred to collectively as "transmitter 726"), and one or more receivers 728 (hereinafter referred to collectively as "receiver 728"). Processor 722 may be configured to execute instructions stored in memory 724 to perform the operations described herein. In some implementations, processor 722 includes or corresponds to one or more of receive processor 258, transmit processor 264, and controller 280, and memory 724 includes or corresponds to memory 282.

Memory 724 includes or is configured to store PRS manager 725. In aspects, PRS manager 725 may be configured to perform operations for configuring, generating and/or managing transmission of a PRS to UE 115*x* using the timing advance offset received from UE 115*x*. As noted above, the timing advance offset received from UE 115*x* may be an offset relative to a timing of a previous transmission transmitted by UE 115*a* to UE 115*x*.

Transmitter 726 is configured to transmit reference signals, control information and data to one or more other devices, and receiver 728 is configured to receive references signals, synchronization signals, control information and data from one or more other devices. For example, transmitter 726 may transmit signaling, control information and data to, and receiver 728 may receive signaling, control information and data from, base station 105. In some implementations, transmitter 726 and receiver 728 may be integrated in one or more transceivers. Additionally or alternatively, transmitter 726 or receiver 728 may include or correspond to one or more components of UE 115 described with reference to FIG. 2.

In some implementations, wireless communications system 700 implements a 5G NR network. For example, wireless communications system 700 may include multiple 5G-capable UEs 115 and multiple 5G-capable base stations 105, such as UEs and base stations configured to operate in accordance with a 5G NR network protocol such as that defined by the 3GPP.

During operation of wireless communication system 700, UE 115*a* transmits a first transmission 770 to UE 115*x*. In aspects, first transmission 770 may be an access-related message such as a discovery message or response, an SL-SSB, etc. UE 115*a* may transmit first transmission 770 at a first transmission time. During operation of wireless communication system 700, UE 115*x* receives first transmission 770 at a first reception time. In aspects, UE 115*x* may also receive a first transmission from other sidelink UEs (not shown). The first transmissions from the other sidelink UEs may also be access-related messages such as a discovery message or response, an SL-SSB, etc. In some aspects, the first transmissions from UE 115*a* and/or from the other sidelink UEs may be transmitted in response to a request from UE 115*x* for UE 115*a* and/or the other sidelink UEs to send the first transmissions.

In aspects, UE 115*x* may determine, or obtain, based on first transmission 770, a timing advance offset for aligning a PRS transmission from UE 115*a*. The timing advance offset may be a timing offset that UE 115*a* may apply to a PRS transmission to be sent to UE 115*x* and that may advance the PRS transmission with respect to the transmission time associated with first transmission 770 from UE 115*a*. In some aspects, UE 115*a* may add the timing advance offset to the PRS transmission compared with the timing used for the first transmission 770 from UE 115*a*.

In aspects, UE 115*x* may determine the timing offset for UE 115*a* based on first transmission 770 received from UE 115*a* and/or the first transmissions received from the other sidelink UEs. In these cases, UE 115*x* may determine that there is a significant difference in the receptions of the first transmissions from UE 115*a* and the first transmission from the other sidelink UEs, and UE 115*x* may determine a timing advance offset for each of UE 115*a* and the other sidelink UEs, in order to ensure that when the PRS transmissions are received by UE 115*x*, if the PRS transmissions from UE 115*a* and the other sidelink UEs are configured to be transmitted in the same symbol, the PRS transmissions are received such that the symbol in which the PRS transmission is transmitted from each of UE 115*a* and the other sidelink UEs are received within a same CP. In aspects, the timing advance offset may be different for different sidelink UEs.

For example, with reference back to FIG. 6A, target UE 115*x* may receive a first transmission (e.g., a discovery message or response, an SL-SSB, etc.) from each of assisting UEs 115*a-c*. In this example, UE 115*x* may determine that there is a significant difference between the reception time of the first transmission at UE 115*x* from the different assisting UEs, which in this case may be due to the difference in distances of the assisting UEs from target UE 115*x*. For example, the first transmission from UE 115*c* may be received by UE 115*x* 200 ms after the first transmission from UE 115*a* is received by UE 115*x*. In this same example, the first transmission from UE 115*b* may be received by UE 115*x* 500 ms after the first transmission from UE 115*a* is received by UE 115*x* (or 300 ms after the first transmission from UE 115*c* is received by UE 115*x*). As such, there is a difference between the transmission timing of assisting UEs 115*a-c* with respect to target UE 115*x*. If each of assisting UEs 115*a-c* transmits a PRS to UE 115*x* that is configured to be transmitted in a same symbol (e.g., PRS transmissions that are FDM'ed in the same symbol), the reception of the PRS transmissions may be misaligned at UE 115*x* as described above (e.g., the symbols may not be received within a same CP). In this case, in accordance with aspects of the present disclosure, target UE 115*x* may determine a timing advance offset for each (or at least a subset) of assisting UEs 115*a-c*. In aspects, the timing advance offset for each of assisting UEs 115*a-c* may be configured to compensate for the difference in the transmission timing from the different assisting UEs so that the reception of the PRS transmissions at UE 115*x* is aligned (e.g., the symbols from the various assisting UEs are received within a same CP).

In another example, with reference back to FIG. 6A, target UE 115*x* may receive a first transmission (e.g., a discovery message or response, an SL-SSB, etc.) from each of assisting UEs 115*a* and 115*b*. In this example, UE 115*x* may determine that there is a significant difference between the reception time of the first transmission at UE 115*x* from the different assisting UEs, which in this case may be due to the synchronization of the different assisting UEs. For example, assisting UE 115*a* may be synchronized from base station 105*a*, and assisting UE 115*b* may be synchronized from base station 105*b*, which is different from base station 105*a*. In this case, the first transmission from UE 115*a* may be received by UE 115*x* at a significantly different time than the first transmission from UE 115*b*. As such, there is a difference between the transmission timing of assisting UEs 115*a* and 115*b* with respect to target UE 115*x*. If each of assisting UEs 115*a* and 115*b* transmits a PRS to UE 115*x* that is configured to be transmitted in a same symbol (e.g., PRS transmissions that are FDM'ed in the same symbol), the reception of the PRS transmissions may be misaligned at UE 115*x* as described above (e.g., the symbols may not be received within a same CP). In this case, in accordance with aspects of the present disclosure, target UE 115*x* may determine a timing advance offset for each (or at least a subset) of assisting UEs 115*a* and 115*b*. In aspects, the timing advance offset for each of assisting UEs 115*a* and 115*b* may be configured to compensate for the synchronization differences of the different assisting UEs so that the reception of the PRS transmissions at UE 115*x* is aligned (e.g., the symbols from the various assisting UEs are received within a same CP).

With reference back to FIG. 7, during operation of wireless communication system 700, UE 115*x* transmits PRS request 775 to UE 115*a*. In aspects, PRS request 775 may be a request for UE 115*a* to transmit a PRS over the sidelink with a timing advance offset indicated in PRS request 775. The indicated timing advance offset may be a timing advance offset determined in accordance with the above description. In some aspects, UE 115*x* may also transmit a PRS request to the other sidelink nodes, including a timing advance offset applicable to each of the other sidelink nodes. In some aspects, the request for a PRS transmission with a timing advance offset may be transmitted to UE 115*a* in response to a determination that the PRS transmission from UE 115*a* is to be multiplexed (e.g., FDM'ed) with other PRS transmissions.

In some aspects, the timing advance offset may include a range or tolerance for the timing advance offset. In these aspects, the timing advance may be provided as a value, plus a range or tolerance, or may be provided solely as a range. For example, PRS request 775 may indicate a timing advance offset for UE 115*a* as a range of TA values. In this case, UE 115*a* may select a value from within the range of values and apply it to the PRS transmission to be transmitted to UE 115*x*.

In aspects, rather than transmitting PRS request to UE 115*a*, UE 115*x* may transmit a PRS request with a timing advance offset to another network node (e.g., a base station or an LMF network entity). In this case, the network node may send to UE 115*a* the request to transmit the PRS with the timing advance offset to UE 115*x*. In some aspects, the network node may select a timing advance offset from the range of timing advance offsets, or may even determine to request a different timing offset to be used by UE 115*a*.

During operation of wireless communication system 700, UE 115*a* may receive PRS request 775 including a timing advance offset to be used for transmitting a PRS to UE 115*x*. In aspects, UE 115*a* may simply apply the timing advance offset indicated in PRS request 775 and may transmit PRS 780 to UE 115*x*. In some aspects, as noted above, the timing advance offset may be indicated as a range or tolerance, in which case, UE 115*a* may select a value from within the indicated range and may apply it to PRS 780 before transmitting. In some aspects, UE 115 may actually determine to transmit PRS 780 using a timing offset that is different from the timing advance offset indicated by UE 115*x* in PRS request 775. For example, UE 115*a* may receive other PRS requests from other sidelink UEs indicating different timing advance offsets to be used when transmitting the PRS. In these cases, UE 115*a* may determine a timing advance offset based on the timing advance offset indicated in PRS request 775 from UE 115*x* and based on the timing advance offsets indicated in the other PRS requests from the other sidelink UEs. For example, in some cases, a timing advance offset range indicated by UE 115*x* may intersect with a timing advance offset range indicated by another sidelink UE. In this case, UE 115*a* may determine to use a timing advance offset based on the intersection of ranges.

In some aspects, when there is no intersection of ranges, UE 115*a* may abort the positioning session.

In some aspects, UE 115*a* may report the selected and/or used timing advance offset to a network node (e.g., a base station or an LMF network entity), for example in the case where the position estimation of UE 115*x* is performed at the network node. In some aspects, for example where the position estimation of UE 115*x* is performed at UE 115*x*, UE 115*a* may report the selected timing advance offset to UE 115*x*.

In aspects, system 700 may be implemented with on-demand timing advance offset update functionality. In these aspects, a sidelink UE (or even a network node such as a base station or an LMF network entity) may request that a timing advance offset used by a sidelink UE transmitting a PRS may be updated. For example, UE 115*a* may receive an unsolicited request to update the timing advance offset used to send PRS 780 to UE 115*x*. In aspects, this update request may be received by UE 115*a* after a positioning/ranging session has started. In some aspects, a sidelink UE receiving a PRS may transmit the request to update the timing advance offset used by the sending sidelink UE.

In aspects, a timing advance offset may be associated with a sidelink PRS configuration, or may be associated to an entire RP-P configuration. For example, resource pools may include more than on PRS configuration. In these cases, different UEs may transmit a respective PRS in different resources (e.g., slots and/or sub-channels) of the resources pool. In these aspects, each timing advance offset may be associated to each PRS configuration specifically. In other aspects, the timing advance offset may be associated with the entire RP-P configuration. In some aspects, the timing advance offset may be indicated and/or reported along with a resource pool ID. For different resource pools, a different timing advance maybe used. In some cases, the same UE may have different positioning sessions with different clusters of network devices. Therefore, in aspects, the alignment for the different clusters may be different.

In some aspects, within a resource pool, it may be assumed that sidelink PRS transmissions within the resource pool are transmitted using a single timing advance offset. In other aspects, a resource pool may be configured to include transmission of PRS using different timing advance offsets. In this case, as shown above, a gap may be configured between transmissions of PRS using different timing advance offsets. In some aspects, instead of transmitting PRS transmissions using different timing advance offsets in a same resource pool, the PRS transmissions using different timing advance offsets may be transmitted in different resource pools, and, as shown above, a gap may already be configured at the end of each slot.

Figure 8A:
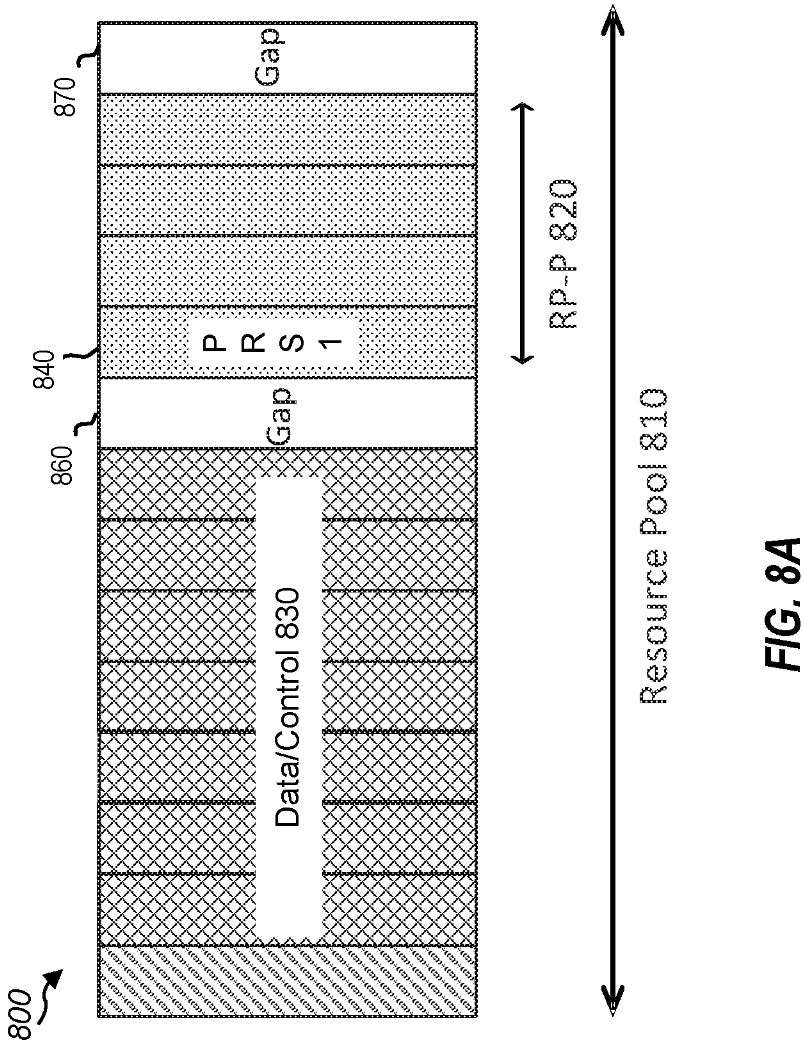
FIG. 8A is a diagram illustrating a resource pool configuration implementing an example of a timing gap between PRS transmissions with different timing advance offsets in accordance with aspects of the present disclosure.

In aspects, when a transmitting sidelink UE (e.g., a sidelink UE transmitting PRS over a sidelink to other sidelink UEs) receives a request to transmit PRS over a sidelink using a different timing advance offsets (e.g., transmit a first PRS using a first timing advance offset and transmit a second PRS using a second timing advance offset), a timing gap may be used to between the different sidelink PRS transmissions in an RP-P. FIG. 8A is a diagram illustrating a resource pool configuration 800 implementing an example of a timing gap between PRS transmissions with different timing advance offsets in accordance with aspects of the present disclosure. In particular, data control 830 may be transmitted within resource pool 810. A sidelink PRS 840 may be transmitted after data control 830. Since data control 830 may be transmitted with a different timing advance offset than the timing advance offset used for sidelink PRS 840, or data control 830 may be transmitted with no timing advance offset, a gap 860 may be configured between data control 830 and sidelink PRS 840. It is noted that gap 870 is a gap traditionally configured at the end of a slot.

Figure 8B:
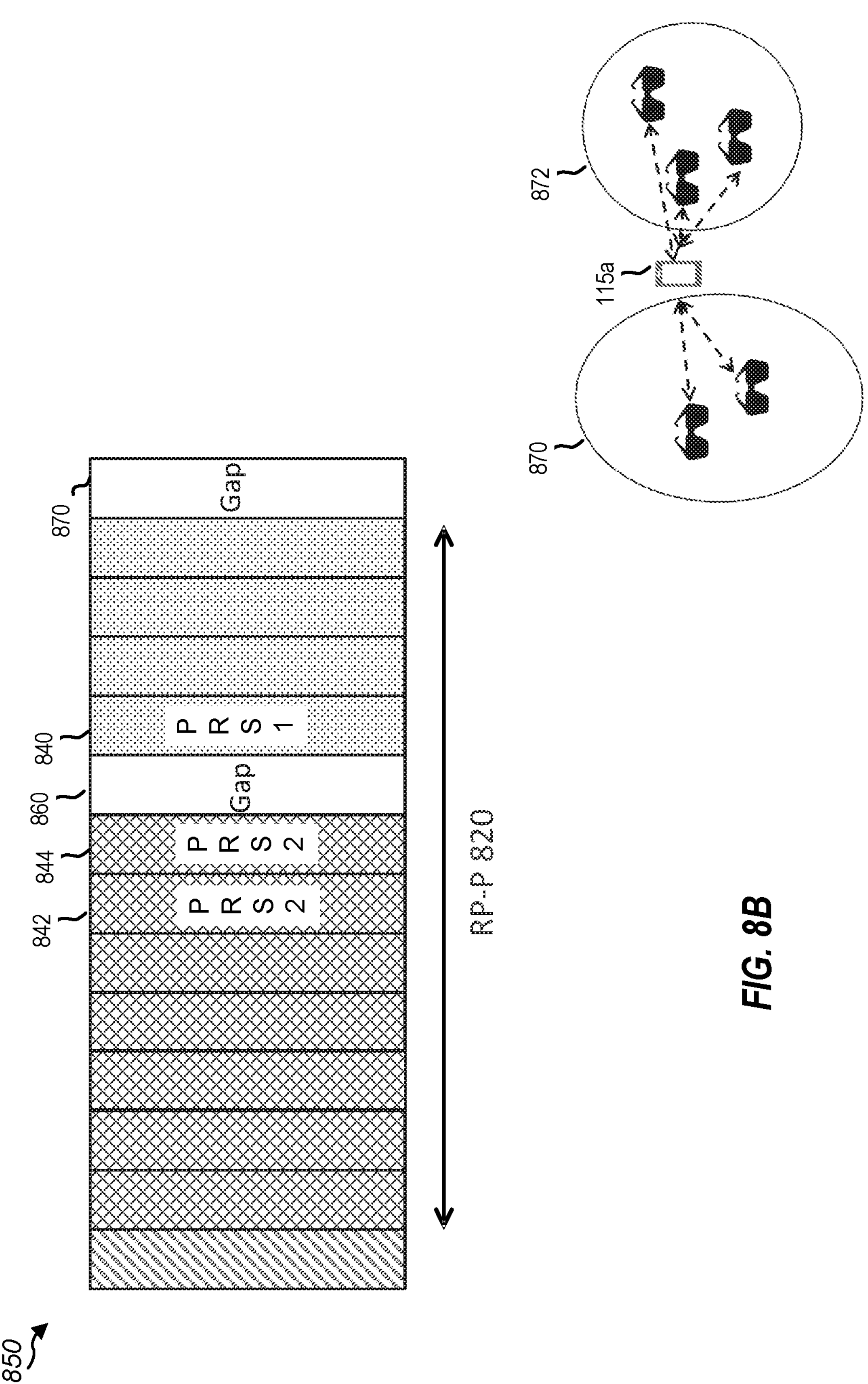
FIG. 8B is a diagram illustrating a resource pool configuration implementing another example of a timing gap between PRS transmissions with different timing advance offsets in accordance with aspects of the present disclosure.

FIG. 8B is a diagram illustrating a resource pool configuration 850 implementing another example of a timing gap between PRS transmissions with different timing advance offsets in accordance with aspects of the present disclosure. In particular, when a timing advance offsets is sidelink PRS specific, and when different sidelink PRSs are to be transmitted in consecutive symbols, a gap may be configured between sidelink PRSs using different timing advance offsets. For example, a timing advance offset may be specific to sidelink PRS 2, which may be transmitted at 842 and 844. In this example, a different timing advance offset may be specific to sidelink PRS 1, which may be transmitted at 840. In this case, as sidelink PRS 1 and sidelink PRS 2 may be transmitted using different timing advance offsets, a gap 860 may be configured between the two different configurations.

In some aspects, a sidelink UE may operate in different positioning sessions with different sidelink UEs. For example, a sidelink UE may operate in a first positioning session with a first cluster of sidelink devices and may also operate in a second positioning session with a second cluster of sidelink devices. In these aspects, the different clusters may have different timing advance offsets associated. In accordance with aspects of the present disclosure, a sidelink UE may be configured to handle different clusters of sidelink UEs using different configurations of a sidelink resource pool. In particular, as shown in FIG. 8A, sidelink UE 115*a* may operate in a first positioning session with first cluster 870 and may also operate in a second positioning session with second cluster 872. In aspects, cluster 870 may be associated with a first timing advance offset (e.g., a timing advance offset for sidelink PRS2), and cluster 872 may be associated with a second timing advance offset (e.g., a timing advance offset for sidelink PRS1), different than the first timing advance offset. In aspects, both cluster 870 and cluster 872 may be configured to transmit PRSs in the same resource pool 820. As described above, in this case, the PRSs for the sidelink UEs in both clusters 870 and 872 may be transmitted in resource pool 820, but a gap may be configured between the PRS transmissions from cluster 870 and cluster 872, as the timing advance offset for the two clusters is different.

In other aspects, cluster 870 may be associated with a first timing advance offset (e.g., a timing advance offset for sidelink PRS2), and cluster 872 may be associated with a second timing advance offset (e.g., a timing advance offset for sidelink PRS1), different than the first timing advance offset. However, in these aspects, rather than transmitting the PRSs from the sidelink UEs of cluster 870 and cluster 872 in the same resource pool 820, cluster 870 and cluster 872 may be configured to transmit PRSs in different resource pools. In this case, as the resource pool for cluster 870 and the resource pool for cluster 872 may be multiplexed (e.g., FDM'ed), no alignment may be needed between UEs that belong to different clusters.

Figure 9:
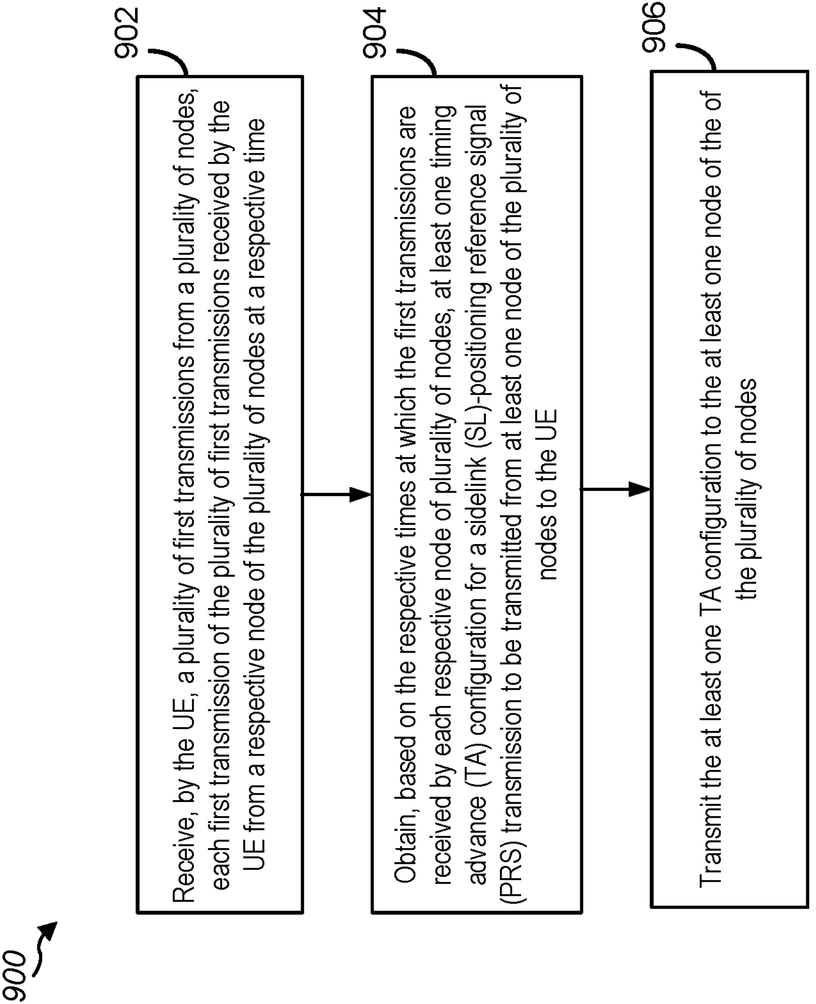
FIG. 9 is a flow diagram illustrating an example process that supports managing transmissions of sidelink PRS with a timing advance offset from a sidelink node according to one or more aspects.
Figure 11:
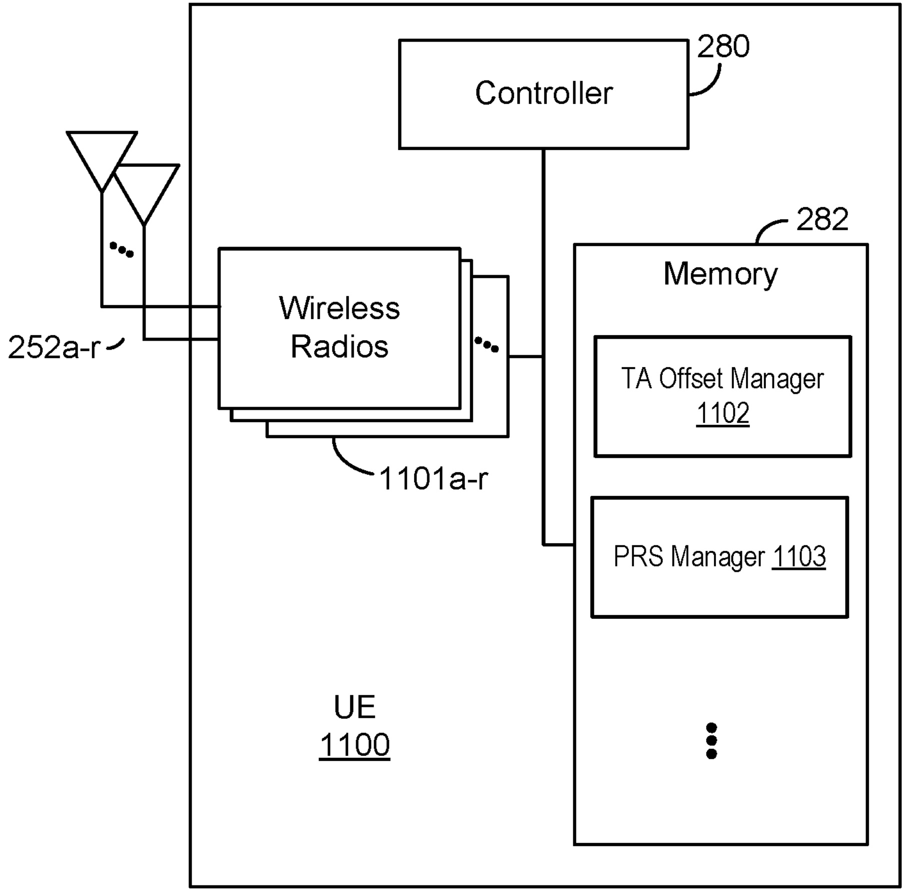
FIG. 11 is a block diagram of an example UE that supports managing transmissions of sidelink PRS with a timing advance offset from a sidelink node according to one or more aspects.

FIG. 9 is a flow diagram illustrating an example process 900 that provides a mechanism for managing transmissions of sidelink PRS with a timing advance offset from a sidelink node in a wireless communication system according to one or more aspects. Operations of process 900 may be performed by a UE, such as target UE 115*x* described above with reference to FIGS. 1-7, or UE 1100 described with reference to FIG. 11. For example, example operations (also referred to as "blocks") of process 900 may enable UE 115 to support managing sidelink PRS transmissions with a timing advance offset from a sidelink node. FIG. 11 is a block diagram illustrating UE 1100 configured according to aspects of the present disclosure. UE 1100 includes the structure, hardware, and components as illustrated for UE 115 of FIG. 2. For example, UE 1100 includes controller/processor 280, which operates to execute logic or computer instructions stored in memory 282, as well as controlling the components of UE 1100 that provide the features and functionality of UE 1100. UE 1100, under control of controller/processor 280, transmits and receives signals via wireless radios 1101*a-r* and antennas 252*a-r*. Wireless radios 1101*a-r* includes various components and hardware, as illustrated in FIG. 2 for UE 1100, including modulator/demodulators 254*a-r*, MIMO detector 256, receive processor 258, transmit processor 264, and TX MIMO processor 266.

At block 902 of process 900, a UE (e.g., UE 1100) receives a plurality of first transmissions from a plurality of nodes, each first transmission of the plurality of first transmissions received by the UE from a respective node of the plurality of nodes at a respective time. For example, UE 100 may receive the plurality of first transmissions from the plurality of nodes via wireless radios 1101*a-r* and antennas 252*a-r*. In aspects, the first transmissions in the plurality of first transmissions may include access-related messages such as a discovery message or response, an SL-SSB, etc. In some aspects, the first transmissions in the plurality of first transmissions may be transmitted from the plurality of nodes in response to a request from UE 1100 to the plurality of nodes to send the plurality of first transmissions.

At block 904, UE 1100 obtains, based on the respective times at which the first transmissions are received from each respective node of the plurality of nodes, at least one timing advance configuration for an sidelink PRS transmission to be transmitted from at least one node of the plurality of nodes to the UE. In order to implement the functionality for such operations, the UE, under control of controller/processor 280, executes timing advance offset manager 1102, stored in memory 282. The functionality implemented through the execution environment of timing advance offset manager 1102 allows for the UE to perform operations to obtain at least one timing advance configuration for an sidelink PRS transmission to be transmitted from at least one node of the plurality of nodes to the UE according to the various aspects herein.

In aspects, the timing advance configuration may specify a timing advance offset that an assisting node (e.g., a node of the plurality of nodes) is to use when transmitting the SL-PRS to UE 1100 to advance the SL-PRS transmission with respect to the transmission time of the first transmission based upon which UE 1100 obtains the timing advance offset. In aspects, and assisting node may add the timing advance offset to the SL-PRS transmission compared with the timing used for the first transmission from the assisting node to UE 1100.

In aspects, UE 1100 may determine the timing advance offset for the sidelink PRS transmission to be transmitted from a particular node based on the first transmission received from the particular node and the first transmissions received from the other sidelink nodes in the plurality of nodes. In these cases, UE 1100 may determine that there is a significant difference in the reception time of the first transmissions from the particular node and the first transmission from the other sidelink nodes, and UE 1100 may determine a timing advance offset for each of the particular node and the other sidelink nodes, in order to ensure that when the sidelink PRS transmissions are received by UE 1100, if the sidelink PRS transmissions from the particular node and the other sidelink nodes are configured to be transmitted in the same symbol, the PRS transmissions are received such that the symbol in which the PRS transmission is transmitted from each of the particular node and the other sidelink nodes are received within a same CP. In aspects, the timing advance offset may be different for different sidelink nodes.

In aspects, the timing advance offset determined by UE 15 for the nodes in the plurality of nodes may include a range of timing offset values. For example, UE 1100 may determine a range of timing advance offset values from which an assisting node (or another network node such as a base station or an LMF) may select when determining a timing advance offset to apply to a PRS transmission to UE 1100. In aspects, the range of timing advance offset values may include a plurality of timing advance offset values.

At block 906, UE 1100 transmits the at least one timing advance configuration to the at least one node of the of the plurality of nodes. For example, UE 1100 may transmit the one timing advance configuration to the at least one node via wireless radios 1101*a-r* and antennas 252*a-r*. In aspects, the at least one node (e.g., an assisting node) may apply the timing advance offset in the at least one timing advance configuration to a sidelink PRS transmission transmitted to UE 1100. In aspects, when the at least one timing advance configuration includes a range of timing advance offsets, the assisting node may select (or a base station or LMF network entity may indicate to the assisting node) a timing advance offset from the range of timing advance offsets, and the selected timing advance offset may be applied to the sidelink PRS transmission.

In aspects, UE 1100 may transmit the at least one the timing advance configuration to a network node (e.g., a base station or an LMF network entity), in which case the network node may be configured to determine a timing advance offset that the assisting node is to use when transmitting the sidelink PRS transmission to UE 1100. In aspects, the network node may transmit the determined timing advance offset to the at least one node (e.g., the assisting node).

In aspects, UE 1100 may determine that a timing advance configuration update condition has occurred, and in response, may update the timing advance configuration for sidelink PRS transmissions from the at least one node. In aspects, a network node (e.g., a base station or an LMF network entity) may make the determination as to whether a timing advance configuration update condition has occurred, and may update the timing advance configuration for sidelink PRS transmissions from the at least one node in response to a determination that the that timing advance configuration update condition has occurred. In aspects, the updated the timing advance configuration may be transmitted (e.g., from UE 1100 or from the network node) to the at least one node (e.g., the assisting node).

In aspects, the timing advance configuration update condition may include one or more of: determining that the position of UE 1100 has changed, determining that reception of SL-PRS transmissions from one or more nodes of the plurality of nodes is misaligned, an indication that the position of the one or more nodes of the plurality of nodes has changed, or an indication that sidelink PRS transmissions from one or more nodes of the plurality of nodes are misaligned with respect to UE 1100.

Figure 10:
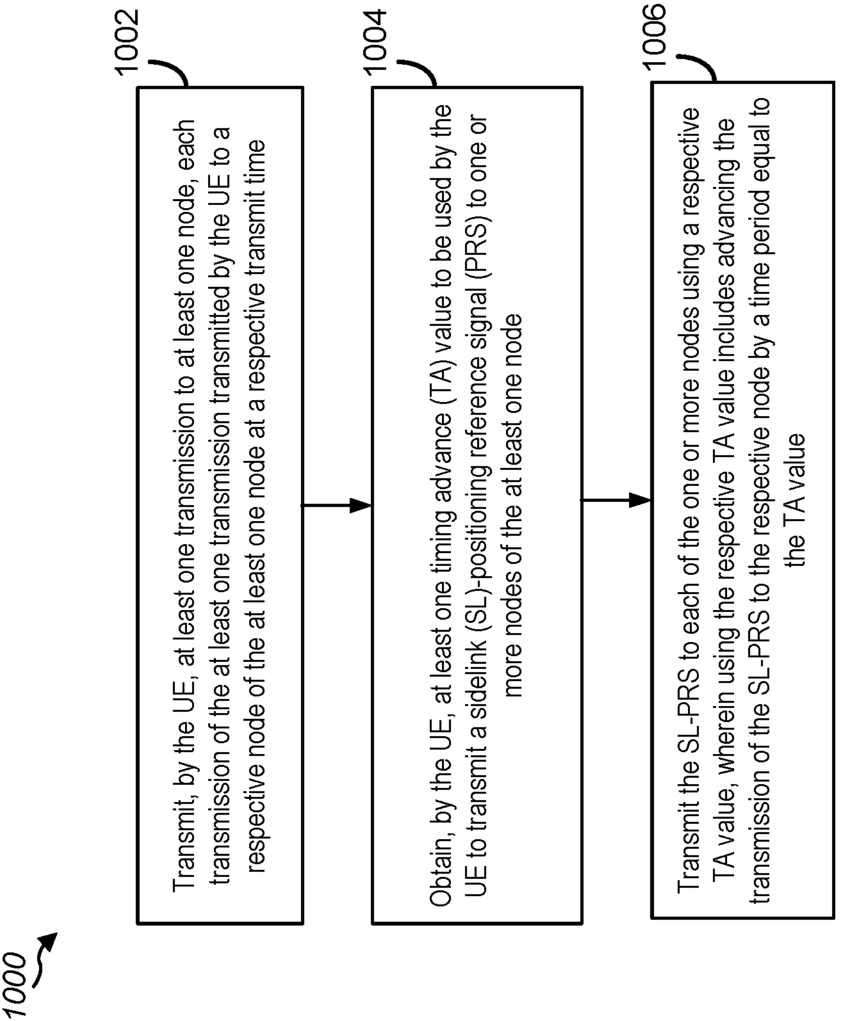
FIG. 10 is a flow diagram illustrating another example process that supports managing transmissions of sidelink PRS with a timing advance offset from a sidelink node according to one or more aspects.

FIG. 10 is a flow diagram illustrating an example process 1000 that provides a mechanism for managing transmissions of sidelink PRS with a timing advance offset from a sidelink node in a wireless communication system according to one or more aspects. Operations of process 1000 may be performed by a UE, such as assisting UE 115*a* described above with reference to FIGS. 1-7, or UE 1100 described with reference to FIG. 11. For example, example operations (also referred to as "blocks") of process 1000 may enable UE 115 to support managing sidelink PRS transmissions with a timing advance offset from a sidelink node.

At block 1002 of process 1000, a UE (e.g., UE 1100) transmits at least one transmission to at least one node (e.g., a target node), each transmission of the at least one transmission transmitted by the UE to a respective node of the at least one node at a respective transmit time. For example, UE 1100 may transmit the t least one transmission to the at least one node via wireless radios 1101*a-r* and antennas 252*a-r*. In aspects, the at least one transmission may include access-related messages such as a discovery message or response, an SL-SSB, etc. In some aspects, the at least one transmission may be transmitted to the at least one node in response to a request from the at least one node for UE 100 to send the at least one transmission.

At block 1004, UE 1100 obtains at least one timing advance value to be used by UE 1100 to transmit a sidelink PRS to one or more nodes of the at least one node. In order to implement the functionality for such operations, the UE, under control of controller/processor 280, executes PRS manager 1103, stored in memory 282. The functionality implemented through the execution environment of PRS manager 1103 allows for the UE to perform operations to obtain at least one timing advance value to be used by the UE to transmit a sidelink PRS to one or more nodes of the at least one node according to the various aspects herein.

In aspects, UE 1100 may receive a timing advance value from a sidelink node of the at least one node (e.g., a target UE), where the sidelink node may determine the timing advance value based on the at least one transmission from UE 1100 and from other transmissions received from other sidelink nodes. In aspects, the timing advance value may be determined by a network node (e.g., a base station or an LMF network entity), and the network node may then transmit the timing advance value to UE 1100.

At block 1006, UE 1100 transmits the sidelink PRS to each of the one or more nodes using a respective the timing advance value. For example, UE 1100 may transmit a sidelink PRS to each of the one or more nodes using a respective the timing advance value via wireless radios 1101*a-r* and antennas 252*a-r*. In aspects, using the respective TA value may include advancing the transmission of the sidelink PRS to the respective node by a time period equal to the TA value. In aspects, transmitting the sidelink PRS to each of the one or more nodes using a respective the timing advance value may include transmitting a sidelink PRS to a first node using a first the timing advance value, where using the first the timing advance value includes advancing the transmission of the sidelink PRS to the first node by a time period equal to the first the timing advance value, and transmitting a sidelink PRS to a second node using a second timing advance value, where using the second the timing advance value includes advancing the transmission of the SL-PRS to the second node by a time period equal to the second the timing advance value.

In aspects, the timing advance value received from the at least one node may include a range of the timing advance values. In aspects, the range of the timing advance values received from a respective node may indicate a range values determined to be valid by the respective node for the sidelink PRS transmission to the respective node from UE 1100.

In one or more aspects, techniques for providing a mechanism for managing transmissions of sidelink PRS with a timing advance offset from a sidelink node in a wireless communication system according to one or more aspects may include additional aspects, such as any single aspect or any combination of aspects described below or in connection with one or more other processes or devices described elsewhere herein. In a first aspect, providing a mechanism for managing transmissions of sidelink PRS with a timing advance offset from a sidelink node in a wireless communication system may include an apparatus configured to receive a plurality of first transmissions from a plurality of nodes, each first transmission of the plurality of first transmissions received by the UE from a respective node of the plurality of nodes at a respective time, to obtain, based on the respective times at which the first transmissions are received from each respective node of the plurality of nodes, at least one timing advance (TA) configuration for a sidelink (SL)-PRS transmission to be transmitted from at least one node of the plurality of nodes to the UE, and to transmit the at least one TA configuration to the at least one node of the of the plurality of nodes. Additionally, the apparatus may perform or operate according to one or more aspects as described below. In some implementations, the apparatus includes a wireless device, such as a UE (e.g., a target UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, obtaining the at least one TA configuration includes determining a TA offset for modifying, by the at least one node, the SL-PRS transmission from the at least one node, the modification by the at least one node being based at least in part on the TA offset and the respective first transmission received from the at least one node of the plurality of nodes.

In a third aspect, alone or in combination with the second aspect, obtaining the at least one TA configuration includes including, in the at least one TA configuration transmitted to the at least one node, the determined TA offset.

In a fourth aspect, alone or in combination with one or more of the first aspect through the third aspect, determining the TA offset includes measuring a reception time difference between the respective time at which the first transmission is received from a first node of the plurality of nodes and the respective time at which the first transmission is received from a second node of the plurality of nodes.

In a fifth aspect, alone or in combination with the fourth aspect, determining the TA offset includes configuring, based on the measured reception time difference, the TA offset for at least one of the first node or the second node, the TA offset configured to align SL-PRS receptions, at the apparatus, from the first node and the second node to each other.

In a sixth aspect, alone or in combination with one or more of the first aspect through the fifth aspect, configuring the TA offset to align SL-PRS receptions from the first node and the second node to each other includes configuring the TA offset to ensure that symbols received from a SL-PRS transmission from the first node and symbols received from a SL-PRS transmission from the second node are received within a same CP.

In a seventh aspect, alone or in combination with one or more of the first aspect through the sixth aspect, configuring the TA offset to align SL-PRS receptions from the first node and the second node to each other includes configuring a first TA offset for the first node of the plurality of nodes.

In an eighth aspect, alone or in combination with the seventh aspect, configuring the TA offset to align SL-PRS receptions from the first node and the second node to each other includes configuring a second TA offset for a second node of the plurality of nodes.

In a ninth aspect, alone or in combination with one or more of the seventh aspect through the eighth aspect, the first TA offset is different than the second TA offset, the at least one TA configuration includes a first TA configuration with the first TA offset for the first node, and a second TA configuration with the second TA offset for the second node.

In a tenth aspect, alone or in combination with one or more of the first aspect through the ninth aspect, the techniques of the first aspect include receiving the SL-PRS transmission from the at least one node of the plurality of nodes, the SL-PRS transmission transmitted by the at least one node at a transmit time using a TA determined by the at least one node based at least in part on the TA offset of the at least one TA configuration and the respective first transmission received from the at least one node of the plurality of nodes.

In an eleventh aspect, alone or in combination with one or more of the first aspect through the tenth aspect, the SL-PRS transmission from the at least one node of the plurality of nodes includes a plurality of SL-PRS transmissions from more than one node of the at least one node FDM'ed within a frequency spectrum of a resource pool, each SL-PRS transmission of the plurality of SL-PRS transmissions transmitted from a respective node using a respective TA.

In a twelfth aspect, alone or in combination with one or more of the first aspect through the eleventh aspect, determining the TA offset for modifying the SL-PRS transmission from the at least one node based at least in part on the TA offset and the respective first transmission received from the at least one node of the plurality of nodes includes determining, based on the respective times at which the first transmissions are received by each respective node of plurality of nodes, a range of TA offset values, at the apparatus, from a first node of the at least one node and a second node of the at least one node to be within a reception window.

In a thirteenth aspect, alone or in combination with one or more of the first aspect through the twelfth aspect, the techniques of the first aspect include receiving an indication of a value of the range of values selected by the at least one node for the TA offset, wherein the selected value is used by the at least one node to determine a TA for applying to the SL-PRS transmission, wherein the indication is received from one or more of: a network node or the at least one node.

In a fourteenth aspect, alone or in combination with one or more of the first aspect through the thirteenth aspect, the techniques of the first aspect include determining that the range of TA offset values is not configured to align SL-PRS receptions, at the apparatus, from a third node of the at least one node and one or more of the first node and the second node to be within the reception window.

In a fifteenth aspect, alone or in combination with the fourteenth aspect, the techniques of the first aspect include including, in the at least one TA configuration, an abort indication for the third node to terminate a position estimation session between the apparatus and the third node, wherein the SL-PRS transmission by the third node is forgone.

In a sixteenth aspect, alone or in combination with one or more of the first aspect through the fifteenth aspect, transmitting the at least one TA configuration to the at least one node of the of the plurality of nodes includes transmitting the at least one TA configuration to a network node.

In a seventeenth aspect, alone or in combination with the sixteenth aspect, the network node is configured to determine a TA offset, based on the at least one TA configuration, to be used by the at least one node for modifying the SL-PRS transmission relative to the respective first transmission from the at least one node, and to transmit the TA offset to the at least one node.

In an eighteenth aspect, alone or in combination with one or more of the first aspect through the seventeenth aspect, the techniques of the first aspect include determining whether a TA configuration update condition has occurred.

In a nineteenth aspect, alone or in combination with one or more of the first aspect through the eighteenth aspect, the techniques of the first aspect include updating, based on a determination that a TA configuration update condition has occurred, the TD configuration for SL-PRS transmissions from the at least one node.

In a twentieth aspect, alone or in combination with one or more of the first aspect through the nineteenth aspect, the techniques of the first aspect include transmitting the updated TA configuration to the at least one node.

In a twenty-first aspect, alone or in combination with one or more of the first aspect through the twentieth aspect, the TA configuration update condition includes one or more of: determining that the position of the apparatus has changed, determining that reception of SL-PRS transmissions from one or more nodes of the plurality of nodes are misaligned, an indication that the position of the one or more nodes of the plurality of nodes has changed, or an indication that SL-PRS transmissions from one or more nodes of the plurality of nodes are misaligned with respect to the apparatus.

In a twenty-second aspect, alone or in combination with one or more of the first aspect through the twenty-first aspect, the respective first transmission received from each node of a plurality of nodes includes one or more of: a discovery message request, a discovery message response, or an SL-SSB message.

In a twenty-third aspect, alone or in combination with one or more of the first aspect through the twenty-second aspect, the apparatus is one of a target UE or an assisting UE.

In a twenty-fourth aspect, techniques for providing a mechanism for managing transmissions of sidelink PRS with a timing advance offset from a sidelink node in a wireless communication system may include an apparatus configured to transmit, by the apparatus, at least one transmission to at least one node, each transmission of the at least one transmission transmitted by the apparatus to a respective node of the at least one node at a respective transmit time, to obtain by the apparatus, at least TA value to be used by the UE to transmit an SL-PRS to one or more nodes of the at least one node, and to transmit the SL-PRS to each of the one or more nodes using a respective TA value. In aspects, using the respective TA value includes advancing the transmission of the SL-PRS to the respective node by a time period equal to the TA value. Additionally, the apparatus may perform or operate according to one or more aspects as described below. In some implementations, the apparatus includes a wireless device, such as a UE (e.g., an assisting UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-fifth aspect, alone or in combination with one or more of the twenty-fourth aspect through the twenty-fourth aspect, each of the at least one TA value is based on a TA offset determined by a respective node of the one or more nodes to which the SL-PRS is to be transmitted using a respective TA value.

In a twenty-sixth aspect, alone or in combination with one or more of the twenty-fourth aspect through the twenty-fifth aspect, the techniques of the twenty-fourth aspect include one or more of: receiving, the TA offset determined by the respective node of the one or more nodes to which the SL-PRS is to be transmitted using the respective TA value, from one or more of: a network node and the respective node of the one or more nodes, or determining each of the at least one TA value based on the TA offset.

In a twenty-seventh aspect, alone or in combination with one or more of the twenty-fourth aspect through the twenty-sixth aspect, obtaining the at least one TA value includes obtaining a first TA value to be used for transmitting the SL-PRS to a first node of the one or more nodes.

In a twenty-eighth aspect, alone or in combination with the twenty-seventh aspect, obtaining the at least one TA value includes obtaining a second TA value to be used for transmitting the SL-PRS to a second node of the one or more nodes.

In a twenty-ninth aspect, alone or in combination with one or more of the twenty-fourth aspect through the twenty-eighth aspect, transmitting the SL-PRS to each of the one or more nodes using a respective TA value includes transmitting the SL-PRS to the first node using the first TA value.

In a thirtieth aspect, alone or in combination with the twenty-ninth aspect, using the first TA value includes advancing the transmission of the SL-PRS to the first node by a time period equal to the first TA value.

In a thirty-first aspect, alone or in combination with one or more of the twenty-fourth aspect through the thirtieth aspect, transmitting the SL-PRS to each of the one or more nodes using a respective TA value includes transmitting the SL-PRS to the second node using the second TA value.

In a thirty-second aspect, alone or in combination with one or more of the twenty-ninth aspect through the thirty-first aspect, using the second TA value includes advancing the transmission of the SL-PRS to the second node by a time period equal to the second TA value.

In a thirty-third aspect, alone or in combination with one or more of the twenty-ninth aspect through the thirty-second aspect, the TA offset determined by the respective node of the one or more nodes to which the SL-PRS is to be transmitted using the respective TA value includes a range of TA offset values.

In a thirty-fourth aspect, alone or in combination with the thirty-fourth aspect, the range of TA offset values indicates a range values determined to be valid by the respective node for the SL-PRS transmission to the respective node from the UE.

In a thirty-fifth aspect, alone or in combination with one or more of the twenty-fourth aspect through the thirty-third aspect, the techniques of the twenty-fourth aspect include obtaining a value from the range of TA offset values to transmit the SL-PRS to the respective node.

In a thirty-sixth aspect, alone or in combination with the thirty-fifth aspect, the techniques of the twenty-fourth aspect include transmitting an indication of the obtained value from the range of TA offset values to the respective node of the one or more nodes.

In a thirty-seventh aspect, alone or in combination with one or more of the twenty-fourth aspect through the thirty-sixth aspect, transmitting the SL-PRS to each of the one or more nodes using a respective TA value includes transmitting a plurality of SL-PRS transmissions to a plurality of nodes of the one or more nodes, wherein each SL-PRS of the plurality of SL-PRS transmissions is transmitted in a respective resource of at least one resource pool.

In a thirty-eighth aspect, alone or in combination with one or more of the twenty-fourth aspect through the thirty-seventh aspect, transmitting the plurality of SL-PRS transmissions to the plurality of nodes includes transmitting a first SL-PRS of the plurality of SL-PRS transmissions in a first resource of the resource pool.

In a thirty-ninth aspect, alone or in combination with the thirty-eighth aspect, the first SL-PRS is transmitted using a first TA value.

In a fortieth aspect, alone or in combination with one or more of the thirty-eighth aspect through the thirty-ninth aspect, transmitting the plurality of SL-PRS transmissions to the plurality of nodes includes transmitting a second SL-PRS of the plurality of SL-PRS transmissions in a second resource of the resource pool.

In a forty-first aspect, alone or in combination with one or more of the thirty-eighth aspect through the fortieth aspect, the second SL-PRS is transmitted using a second TA value.

In a forty-second aspect, alone or in combination with one or more of the first aspect through the forty-first aspect, the first TA value is different from the second TA value.

In a forty-third aspect, alone or in combination with the forty-second aspect, transmitting the plurality of SL-PRS transmissions to the plurality of nodes includes including a transmission gap between transmitting the first SL-PRS in the first resource and transmitting the second SL-PRS in the second resource.

In a forty-fourth aspect, alone or in combination with one or more of the twenty-fourth aspect through the forty-third aspect, the first TA value is equal to the second TA value.

In a forty-fifth aspect, alone or in combination with the forty-fourth aspect, transmitting the plurality of SL-PRS transmissions to the plurality of nodes includes transmitting the first SL-PRS in the first resource and transmitting the second SL-PRS in the second resource without a transmission gap therein between.

In a forty-sixth aspect, alone or in combination with one or more of the twenty-fourth aspect through the forty-fifth aspect, transmitting the plurality of SL-PRS transmissions to the plurality of nodes includes transmitting a first SL-PRS of the plurality of SL-PRS transmissions in a first resource of the resource pool.

In a forty-seventh aspect, alone or in combination with the forty-sixth aspect, the first SL-PRS is transmitted using a first TA value.

In a forty-eighth aspect, alone or in combination with one or more of the forty-sixth aspect through the forty-seventh aspect, transmitting the plurality of SL-PRS transmissions to the plurality of nodes includes transmitting data in a second resource of the resource pool.

In a forty-ninth aspect, alone or in combination with one or more of the forty-sixth aspect through the forty-eighth aspect, the data is not transmitted using the first TA value.

In a fiftieth aspect, alone or in combination with one or more of the forty-sixth aspect through the forty-ninth aspect, transmitting the plurality of SL-PRS transmissions to the plurality of nodes includes including a transmission gap between transmitting the first SL-PRS in the first resource and transmitting the data in the second resource.

In a fifty-first aspect, alone or in combination with one or more of the twenty-fourth aspect through the fiftieth aspect, the techniques of the twenty-fourth aspect include receiving at least one updated TA configuration from one or more the nodes of the plurality of nodes.

In a fifty-second aspect, alone or in combination with the fifty-first aspect, the at least one updated TA configuration is transmitted from the one or more nodes based on a determination by the one or more nodes that a TA configuration update condition has occurred.

In a fifty-third aspect, alone or in combination with one or more of the twenty-fourth aspect through the fifty-second aspect, the techniques of the twenty-fourth aspect include transmitting at least one SL-PRS to the one or more nodes using the at least one updated TA configuration.

In a fifty-fourth aspect, alone or in combination with one or more of the twenty-fourth aspect through the fifty-third aspect, the at least one transmission includes one or more of: a discovery message request, a discovery message response, or an SL-SSB message.

In a fifty-fifth aspect, alone or in combination with one or more of the twenty-fourth aspect through the fifty-fourth aspect, wherein the apparatus is one of a target UE or an assisting UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure.

Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

receiving, by the UE, a plurality of first transmissions from a plurality of nodes, each first transmission of the plurality of first transmissions received by the UE from a respective node of the plurality of nodes at a respective time;

obtaining, based on the respective times at which the first transmissions are received from each respective node of the plurality of nodes, at least one timing advance (TA) configuration for a sidelink (SL)-positioning reference signal (PRS) transmission to be transmitted from at least one node of the plurality of nodes to the UE; and transmitting the at least one TA configuration to the at least one node of the of the plurality of nodes, wherein the transmitting includes transmitting the at least one TA configuration to a network node, wherein the network node is configured to determine a TA offset, based on the at least one TA configuration, to be used by the at least one node for modifying the SL-PRS transmission relative to the respective first transmission from the at least one node, and to transmit the TA offset to the at least one node.

2. The method of claim 1, wherein obtaining the at least one TA configuration includes:

receiving the SL-PRS transmission from the at least one node of the plurality of nodes, the SL-PRS transmission transmitted by the at least one node at a transmit time using a TA determined by the at least one node based at least in part on the TA offset of the at least one TA configuration and the respective first transmission received from the at least one node of the plurality of nodes;

determining a TA offset for modifying, by the at least one node, the SL-PRS transmission from the at least one node, the modification by the at least one node being based at least in part on the TA offset and the respective first transmission received from the at least one node of the plurality of nodes; and including, in the at least one TA configuration transmitted to the at least one node, the determined TA offset.

3. The method of claim 2, wherein determining the TA offset includes:

measuring a reception time difference between the respective time at which the first transmission is received from a first node of the plurality of nodes and the respective time at which the first transmission is received from a second node of the plurality of nodes; and configuring, based on the measured reception time difference, the TA offset for at least one of the first node or the second node, the TA offset configured to align SL-PRS receptions, at the UE, from the first node and the second node to each other.

4. The method of claim 3, wherein configuring the TA offset to align SL-PRS receptions from the first node and the second node to each other includes:

configuring the TA offset to ensure that symbols received from a SL-PRS transmission from the first node and symbols received from a SL-PRS transmission from the second node are received within a same cyclic prefix (CP).

5. The method of claim 3, wherein configuring the TA offset to align SL-PRS receptions from the first node and the second node to each other includes:

configuring a first TA offset for the first node of the plurality of nodes; and configuring a second TA offset for a second node of the plurality of nodes, wherein the first TA offset is different than the second TA offset, and wherein the at least one TA configuration includes a first TA configuration with the first TA offset for the first node, and a second TA configuration with the second TA offset for the second node.

6. The method of claim 1, wherein the respective first transmission received from each node of a plurality of nodes includes one or more of: a discovery message request, a discovery message response, or a sidelink (SL) synchronization signal block (SL-SSB) message and further comprising:

determining, by the UE, whether a TA configuration update condition has occurred, wherein the TA configuration update condition includes one or more of:

determining, by the UE, that the position of the UE has changed;

determining, by the UE, that reception of SL-PRS transmissions from one or more nodes of the plurality of nodes are misaligned;

an indication that the position of the one or more nodes of the plurality of nodes has changed; or an indication that SL-PRS transmissions from one or more nodes of the plurality of nodes are misaligned with respect to the UE;

updating, based on a determination that a TA configuration update condition has occurred, the TD configuration for SL-PRS transmissions from the at least one node; and transmitting the updated TA configuration to the at least one node.

7. A method of wireless communication performed by a user equipment (UE), the method comprising:

transmitting, by the UE, at least one transmission to at least one node, each transmission of the at least one transmission transmitted by the UE to a respective node of the at least one node at a respective transmit time;

obtaining by the UE, at least one timing advance (TA) value to be used by the UE to transmit a sidelink (SL)-positioning reference signal (PRS) to one or more nodes of the at least one node; and transmitting the SL-PRS to each of the one or more nodes using a respective TA value, wherein using the respective TA value includes advancing the transmission of the SL-PRS to the respective node by a time period equal to the TA value, and wherein each of the at least one TA value is based on a TA offset determined by a respective node of the one or more nodes to which the SL-PRS is to be transmitted using a respective TA value, the method further comprising one or more of:

receiving, the TA offset determined by the respective node of the one or more nodes to which the SL-PRS is to be transmitted using the respective TA value, from one or more of: a network node and the respective node of the one or more nodes; and determining each of the at least one TA value based on the TA offset.

8. The method of claim 7, wherein:

obtaining the at least one TA value includes:

obtaining a first TA value to be used for transmitting the SL-PRS to a first node of the one or more nodes; and obtaining a second TA value to be used for transmitting the SL-PRS to a second node of the one or more nodes; and transmitting the SL-PRS to each of the one or more nodes using a respective TA value includes:

transmitting, by the UE, the SL-PRS to the first node using the first TA value, wherein using the first TA value includes advancing the transmission of the SL-PRS to the first node by a time period equal to the first TA value; and transmitting, by the UE, the SL-PRS to the second node using the second TA value, wherein using the second TA value includes advancing the transmission of the SL-PRS to the second node by a time period equal to the second TA value.

9. The method claim 7, wherein transmitting the SL-PRS to each of the one or more nodes using a respective TA value includes transmitting a plurality of SL-PRS transmissions to a plurality of nodes of the one or more nodes, wherein each SL-PRS of the plurality of SL-PRS transmissions is transmitted in a respective resource of at least one resource pool.

10. The method of claim 9, wherein transmitting the plurality of SL-PRS transmissions to the plurality of nodes includes:

transmitting a first SL-PRS of the plurality of SL-PRS transmissions in a first resource of the resource pool, wherein the first SL-PRS is transmitted using a first TA value;

transmitting a second SL-PRS of the plurality of SL-PRS transmissions in a second resource of the resource pool, wherein the second SL-PRS is transmitted using a second TA value; and including a transmission gap between transmitting the first SL-PRS in the first resource and transmitting the second SL-PRS in the second resource, wherein the first TA value is different from the second TA value.

11. The method of claim 9, wherein transmitting the plurality of SL-PRS transmissions to the plurality of nodes includes:

transmitting a first SL-PRS of the plurality of SL-PRS transmissions in a first resource of the resource pool, wherein the first SL-PRS is transmitted using a first TA value;

transmitting data in a second resource of the resource pool, wherein the data is not transmitted using the first TA value; and including a transmission gap between transmitting the first SL-PRS in the first resource and transmitting the data in the second resource.

12. The method of claim 7, wherein at least one transmission includes one or more of: a discovery message request, a discovery message response, or a sidelink (SL) synchronization signal block (SL-SSB) message, the method further comprising:

receiving, by the UE, at least one updated TA configuration from one or more the nodes of the plurality of nodes, wherein the at least one updated TA configuration is transmitted from the one or more nodes based on a determination by the one or more nodes that a TA configuration update condition has occurred; and transmitting at least one SL-PRS to the one or more nodes using the at least one updated TA configuration.

13. An apparatus for wireless communication at a user equipment (UE), comprising:

at least one processor; and a memory coupled with the at least one processor and storing processor-readable code that, when executed by the at least one processor, is configured to perform operations including:

receiving, by the UE, a plurality of first transmissions from a plurality of nodes, each first transmission of the plurality of first transmissions received by the UE from a respective node of the plurality of nodes at a respective time;

obtaining, based on the respective times at which the first transmissions are received from each respective node of the plurality of nodes, at least one timing advance (TA) configuration for a sidelink (SL)-positioning reference signal (PRS) transmission to be transmitted from at least one node of the plurality of nodes to the UE; and transmitting the at least one TA configuration to the at least one node of the of the plurality of nodes, wherein the transmitting includes transmitting the at least one TA configuration to a network node, wherein the network node is configured to determine a TA offset, based on the at least one TA configuration, to be used by the at least one node for modifying the SL-PRS transmission relative to the respective first transmission from the at least one node, and to transmit the TA offset to the at least one node.

14. The apparatus of claim 13, wherein obtaining the at least one TA configuration includes:

receiving the SL-PRS transmission from the at least one node of the plurality of nodes, the SL-PRS transmission transmitted by the at least one node at a transmit time using a TA determined by the at least one node based at least in part on the TA offset of the at least one TA configuration and the respective first transmission received from the at least one node of the plurality of nodes;

determining a TA offset for modifying, by the at least one node, the SL-PRS transmission from the at least one node, the modification by the at least one node being based at least in part on the TA offset and the respective first transmission received from the at least one node of the plurality of nodes; and including, in the at least one TA configuration transmitted to the at least one node, the determined TA offset.

15. The apparatus of claim 14, wherein determining the TA offset includes:

measuring a reception time difference between the respective time at which the first transmission is received from a first node of the plurality of nodes and the respective time at which the first transmission is received from a second node of the plurality of nodes; and configuring, based on the measured reception time difference, the TA offset for at least one of the first node or the second node, the TA offset configured to align SL-PRS receptions, at the UE, from the first node and the second node to each other.

16. The apparatus of claim 15, wherein configuring the TA offset to align SL-PRS receptions from the first node and the second node to each other includes:

configuring the TA offset to ensure that symbols received from a SL-PRS transmission from the first node and symbols received from a SL-PRS transmission from the second node are received within a same cyclic prefix (CP).

17. The apparatus of claim 15, wherein configuring the TA offset to align SL-PRS receptions from the first node and the second node to each other includes:

configuring a first TA offset for the first node of the plurality of nodes; and configuring a second TA offset for a second node of the plurality of nodes, wherein the first TA offset is different than the second TA offset, and wherein the at least one TA configuration includes a first TA configuration with the first TA offset for the first node, and a second TA configuration with the second TA offset for the second node.

18. The apparatus of claim 13, wherein the respective first transmission received from each node of a plurality of nodes includes one or more of: a discovery message request, a discovery message response, or a sidelink (SL) synchronization signal block (SL-SSB) message and wherein the operations further comprise:

determining, by the UE, whether a TA configuration update condition has occurred, wherein the TA configuration update condition includes one or more of:

determining, by the UE, that the position of the UE has changed;

determining, by the UE, that reception of SL-PRS transmissions from one or more nodes of the plurality of nodes are misaligned;

an indication that the position of the one or more nodes of the plurality of nodes has changed; or an indication that SL-PRS transmissions from one or more nodes of the plurality of nodes are misaligned with respect to the UE; and updating, based on a determination that a TA configuration update condition has occurred, the TD configuration for SL-PRS transmissions from the at least one node; and transmitting the updated TA configuration to the at least one node.

19. An apparatus for wireless communication at a user equipment (UE), comprising:

at least one processor; and a memory coupled with the at least one processor and storing processor-readable code that, when executed by the at least one processor, is configured to perform operations including:

transmitting, by the UE, at least one transmission to at least one node, each transmission of the at least one transmission transmitted by the UE to a respective node of the at least one node at a respective transmit time;

obtaining by the UE, at least one timing advance (TA) value to be used by the UE to transmit a sidelink (SL)-positioning reference signal (PRS) to one or more nodes of the at least one node; and transmitting the SL-PRS to each of the one or more nodes using a respective TA value, wherein using the respective TA value includes advancing the transmission of the SL-PRS to the respective node by a time period equal to the TA value, wherein each of the at least one TA value is based on a TA offset determined by a respective node of the one or more nodes to which the SL-PRS is to be transmitted using a respective TA value, wherein the operations further comprise one or more of:

receiving. the TA offset determined by the respective node of the one or more nodes to which the SL-PRS is to be transmitted using the respective TA value, from one or more of: a network node and the respective node of the one or more nodes; and determining each of the at least one TA value based on the TA offset.

20. The apparatus of claim 19, wherein obtaining the at least one TA value includes:

obtaining a first TA value to be used for transmitting the SL-PRS to a first node of the one or more nodes; and obtaining a second TA value to be used for transmitting the SL-PRS to a second node of the one or more nodes; and transmitting the SL-PRS to each of the one or more nodes using a respective TA value includes:

transmitting, by the UE, the SL-PRS to the first node using the first TA value, wherein using the first TA value includes advancing the transmission of the SL-PRS to the first node by a time period equal to the first TA value; and transmitting, by the UE, the SL-PRS to the second node using the second TA value, wherein using the second TA value includes advancing the transmission of the SL-PRS to the second node by a time period equal to the second TA value.

21. The apparatus of claim 19, wherein transmitting the SL-PRS to each of the one or more nodes using a respective TA value includes transmitting a plurality of SL-PRS transmissions to a plurality of nodes of the one or more nodes, wherein each SL-PRS of the plurality of SL-PRS transmissions is transmitted in a respective resource of at least one resource pool.

22. The apparatus of claim 21, wherein transmitting the plurality of SL-PRS transmissions to the plurality of nodes includes:

transmitting a first SL-PRS of the plurality of SL-PRS transmissions in a first resource of the resource pool, wherein the first SL-PRS is transmitted using a first TA value;

transmitting a second SL-PRS of the plurality of SL-PRS transmissions in a second resource of the resource pool, wherein the second SL-PRS is transmitted using a second TA value; and including a transmission gap between transmitting the first SL-PRS in the first resource and transmitting the second SL-PRS in the second resource, wherein the first TA value is different from the second TA value.

23. The apparatus of claim 21, wherein transmitting the plurality of SL-PRS transmissions to the plurality of nodes includes:

transmitting a first SL-PRS of the plurality of SL-PRS transmissions in a first resource of the resource pool, wherein the first SL-PRS is transmitted using a first TA value;

transmitting data in a second resource of the resource pool, wherein the data is not transmitted using the first TA value; and including a transmission gap between transmitting the first SL-PRS in the first resource and transmitting the data in the second resource.

24. The apparatus of claim 19 wherein at least one transmission includes one or more of: a discovery message request, a discovery message response, or a sidelink (SL) synchronization signal block (SL-SSB) message, and wherein the operations further comprise:

receiving, by the UE, at least one updated TA configuration from one or more the nodes of the plurality of nodes, wherein the at least one updated TA configuration is transmitted from the one or more nodes based on a determination by the one or more nodes that a TA configuration update condition has occurred; and transmitting at least one SL-PRS to the one or more nodes using the at least one updated TA configuration.

25. A non-transitory computer-readable medium storing instructions that, when executed by a processor, cause the processor to perform operations comprising:

receiving, by a user equipment (UE), a plurality of first transmissions from a plurality of nodes, each first transmission of the plurality of first transmissions received by the UE from a respective node of the plurality of nodes at a respective time;

obtaining, based on the respective times at which the first transmissions are received from each respective node of the plurality of nodes, at least one timing advance (TA) configuration for a sidelink (SL)-positioning reference signal (PRS) transmission to be transmitted from at least one node of the plurality of nodes to the UE; and transmitting the at least one TA configuration to the at least one node of the of the plurality of nodes, wherein the transmitting includes transmitting the at least one TA configuration to a network node, wherein the network node is configured to determine a TA offset, based on the at least one TA configuration, to be used by the at least one node for modifying the SL-PRS transmission relative to the respective first transmission from the at least one node, and to transmit the TA offset to the at least one node.

26. The non-transitory computer-readable medium of claim 25, wherein obtaining the at least one TA configuration includes:

receiving the SL-PRS transmission from the at least one node of the plurality of nodes, the SL-PRS transmission transmitted by the at least one node at a transmit time using a TA determined by the at least one node based at least in part on the TA offset of the at least one TA configuration and the respective first transmission received from the at least one node of the plurality of nodes;

determining a TA offset for modifying, by the at least one node, the SL-PRS transmission from the at least one node, the modification by the at least one node being based at least in part on the TA offset and the respective first transmission received from the at least one node of the plurality of nodes; and including, in the at least one TA configuration transmitted to the at least one node, the determined TA offset.

27. The non-transitory computer-readable medium of claim 26, wherein determining the TA offset includes:

measuring a reception time difference between the respective time at which the first transmission is received from a first node of the plurality of nodes and the respective time at which the first transmission is received from a second node of the plurality of nodes; and configuring, based on the measured reception time difference, the TA offset for at least one of the first node or the second node, the TA offset configured to align SL-PRS receptions, at the UE, from the first node and the second node to each other.

28. The non-transitory computer-readable medium of claim 27, wherein configuring the TA offset to align SL-PRS receptions from the first node and the second node to each other includes:

configuring the TA offset to ensure that symbols received from a SL-PRS transmission from the first node and symbols received from a SL-PRS transmission from the second node are received within a same cyclic prefix (CP).

29. The non-transitory computer-readable medium of claim 27, wherein configuring the TA offset to align SL-PRS receptions from the first node and the second node to each other includes:

configuring a first TA offset for the first node of the plurality of nodes; and configuring a second TA offset for a second node of the plurality of nodes, wherein the first TA offset is different than the second TA offset, and wherein the at least one TA configuration includes a first TA configuration with the first TA offset for the first node, and a second TA configuration with the second TA offset for the second node.

30. The non-transitory computer-readable medium of claim 25, wherein the respective first transmission received from each node of a plurality of nodes includes one or more of: a discovery message request, a discovery message response, or a sidelink (SL) synchronization signal block (SL-SSB) message, and wherein the operations further comprise:

determining, by the UE, whether a TA configuration update condition has occurred, wherein the TA configuration update condition includes one or more of:

determining, by the UE, that the position of the UE has changed;

determining, by the UE, that reception of SL-PRS transmissions from one or more nodes of the plurality of nodes are misaligned;

an indication that the position of the one or more nodes of the plurality of nodes has changed; or an indication that SL-PRS transmissions from one or more nodes of the plurality of nodes are misaligned with respect to the UE; and updating, based on a determination that a TA configuration update condition has occurred, the TA configuration for SL-PRS transmissions from the at least one node; and transmitting the updated TA configuration to the at least one node.

* * * * *